United States Patent
Shinojima et al.

(10) Patent No.: US 7,160,220 B2
(45) Date of Patent: Jan. 9, 2007

(54) CONTINUOUSLY VARIABLE TRANSMISSION APPARATUS

(75) Inventors: Takumi Shinojima, Kanagawa (JP); Eiji Inoue, Kanagawa (JP)

(73) Assignee: NSK Ltd., Tokyo (JP)

( * ) Notice: Subject to any disclaimer, the term of this patent is extended or adjusted under 35 U.S.C. 154(b) by 229 days.

(21) Appl. No.: 10/890,240

(22) Filed: Jul. 14, 2004

(65) Prior Publication Data
US 2005/0037887 A1 Feb. 17, 2005

(30) Foreign Application Priority Data
Jul. 14, 2003 (JP) ............... 2003-274208

(51) Int. Cl.
*F16H 37/12* (2006.01)
(52) U.S. Cl. .................. 475/208; 475/216; 477/37
(58) Field of Classification Search ............. 475/208, 475/216; 477/37, 41
See application file for complete search history.

(56) References Cited

U.S. PATENT DOCUMENTS

| | | | | |
|---|---|---|---|---|
| 4,464,952 A | * | 8/1984 | Stubbs | 475/216 |
| 4,768,398 A | * | 9/1988 | Greenwood | 475/216 |
| 5,453,061 A | * | 9/1995 | Fellows | 475/215 |
| 5,607,372 A | * | 3/1997 | Lohr | 475/216 |
| 6,099,431 A | * | 8/2000 | Hoge et al. | 475/216 |
| 6,251,039 B1 | | 6/2001 | Koga | |

FOREIGN PATENT DOCUMENTS

| | | | | |
|---|---|---|---|---|
| JP | 56-28343 | * | 3/1981 | 475/216 |
| JP | 10-103461 A | | 4/1998 | |
| JP | 2000-220719 A | | 8/2000 | |
| JP | 2004-116577 A | | 4/2004 | |
| JP | 2004-125119 A | | 4/2004 | |

* cited by examiner

*Primary Examiner*—Ha Ho
(74) *Attorney, Agent, or Firm*—Sughrue Mion, PLLC

(57) ABSTRACT

A continuously variable transmission apparatus includes: an input shaft, an output shaft, a toroidal continuously variable transmission, a gear-type differential unit including a plurality of gears, and a controller. The controller calculates a torque actually passing through the toroidal continuously variable transmission to obtain a deviation of the torque from a target value and adjusts a transmission ratio of the toroidal continuously variable transmission to eliminate the deviation. The controller stops the adjustment of the transmission ratio when the torque is not stable.

16 Claims, 13 Drawing Sheets

CONTINUOUSLY VARIABLE TRANSMISSION APPARATUS

BACKGROUND OF THE INVENTION

1. Field of the Invention

The present invention relates to improvement of a continuously variable transmission apparatus, for use in an automatic transmission for a vehicle (automobile), in which a toroidal continuously variable transmission is incorporated. Particularly, the invention relates to a continuously variable transmission apparatus to which is added a function of improving characteristics during a vehicle stop or during very low speed driving while implementing a structure which avoids providing a driver with an uncomfortable feeling at vehicle start.

2. Background Art

A toroidal-type continuously variable transmission as shown in FIGS. 7 to 9 has been investigated as an automatic transmission for a vehicle, and has found limited use. The toroidal continuously variable transmission is referred to as a double cavity type, in which input discs 2, 2 are supported on peripheries of both end portions of an input shaft 1 via ball splines 3, 3. Accordingly, the two input discs 2, 2 are rotatably supported such that they are concentric with each other and rotate synchronously. Further, an output gear 4 is supported rotatably with respect to the input shaft 1 on the periphery of the intermediate portion of the input shaft 1. Output discs 5, 5 are splined at respective end portions of a cylindrical portion provided at the center portion of the output gear 4. Hence, the two output discs 5, 5 rotate synchronously with the output gear 4.

A plurality of power rollers 6, 6 (usually two or three power rollers on each side) are interposed between the input discs 2, 2 and the output discs 5, 5. The power rollers 6, 6 are rotatably supported on the inner surfaces of trunnions 7, 7 respectively via support shafts 8, 8 and a plurality of roller bearings. The trunnions 7, 7 are provided so as to swing around pivot shafts 9, 9 disposed for the respective trunnions 7, 7 on both end portions thereof, in longitudinal directions (i.e., in vertical directions in FIGS. 7 and 9, and in a direction perpendicular to the plane of FIG. 8). The trunnions 7, 7 are inclined by hydraulic actuators 10, 10; specifically, the hydraulic actuators 10, 10 displace the trunnions 7, 7 along the axes of pivot shafts 9, 9. Inclination angles of the trunnions 7, 7 are synchronized hydraulically and mechanically.

That is, in the case where the inclination angles of the trunnions 7, 7 are changed in order to change a transmission ratio between the input shaft 1 and the output gear 4, the trunnions 7, 7 are displaced in opposite directions by the actuators 10, 10, respectively. For example, the power roller 6 on the right-hand side in FIG. 9 is displaced downward in FIG. 9, while the power roller 6 on the left-hand side in FIG. 9 is displaced upward in FIG. 9 by the same distance. As a result, forces acting along a tangential direction of the contact portions between the peripheral surfaces of the power rollers 6, 6 and the inner surfaces of the input side discs 2, 2 and the output side discs 5, 5 are changed in direction (in other words, sideslip occurs at contact portions thereof). Consequently, due to the change in direction of the forces, the trunnions 7, 7 swing (incline) in opposite directions around the pivot shafts 9, 9, which are pivotally supported by support plates 11, 11. As a result, contacting portions between the peripheral surfaces of the power rollers 6, 6 and the inner surfaces of the input discs 2, 2 and the output discs 5, 5 are changed. Thereby, a rotation transmission ratio between the input shaft 1 and the output gear 4 changes.

Pressurized oil is supplied to and discharged from the actuators 10, 10 by means of a single control valve 12, irrespective of the number of the actuators 10, 10. The movement of any one of the trunnions 7 is fed back to the control valve 12. The control valve 12 has a sleeve 14 to be displaced in an axial direction (i.e., in the horizontal direction in FIG. 9, and in a direction perpendicular to the plane of FIG. 7) by a stepping motor 13 and a spool 15 fitted into the inner periphery of the sleeve 14 so as to allow displacement in the axial direction thereof. A feedback mechanism is constituted as follows: rods 17, 17 connect the trunnions 7, 7 and pistons 16, 16 of the respective actuators 10, 10; and a precess cam 18 is fixed on an end portion of each of the rods 17 attached to any one of the trunnions 7, 7. The movement of the rod 17; that is, a resultant total of the displacement in the axial direction and the displacement in the rotating direction, is transmitted to the spool 15 via the precess cam 18 and a link arm 19 to thereby displace the spool 15 in the axial direction. A synchronous cable 20 is suspended between the trunnions 7, 7 in such amanner that the inclination angles of the respective trunnions 7, 7 are mechanically synchronized to each other even in the case where trouble arises in a hydraulic system.

At the time of switching the transmission state, the sleeve 14 is displaced to a position corresponding to a desired transmission ratio by the stepping motor 13 to thereby open a flow path to a predetermined direction of the control valve 12. As a result, the pressurized oil is supplied to the actuators 10, 10 in a predetermined direction, whereby the actuators 10, 10 displace the trunnions 7, 7 in a predetermined direction. That is, in accordance with supply of the pressurized oil, the trunnions 7, 7 swing around the pivot shafts 9, 9 while being displaced in the axial direction of the pivot shafts 9, 9. Then, the motion (i.e., the motion in an axial direction and the swing) of one of the trunnions 7 is transmitted to the spool 15 via the precess cam 18 fixed to the end portion of the rod 17 and the link arm 19 to thereby displace the spool 15 in the axial direction. As a result, the flow path of the control valve 12 is closed in a state where the trunnions 7 are displaced by the predetermined amount, and supply and discharge of the pressurized oil to and from the actuators 10, 10 is stopped.

The operation of the control valve 12 based on the displacement of the trunnion 7 and the cam surface 21 of the precess cam 18 during the above is as follows. First, the trunnion 7 is displaced in the axial direction along with the opening of the flow path of the control valve 12. Then, as described hitherto, in response to the sideslip generated on the contact portions between the peripheral surface of the power roller 6 and the inner peripheral surfaces of the input disc 2 and the output disc 5, the trunnion 7 starts swinging around the pivot shaft 9. Further, along with the displacement of the trunnion 7 in the axial direction, a displacement of a cam surface 21 is transmitted to the spool 15 via the link arm 19. Thereby, the spool 15 is displaced in the axial direction and a state of the control valve 12 is changed. More specifically, the control valve 12 is switched, by the actuator 10, in a direction of returning the trunnion 7 to a neutral position.

Accordingly, immediately after the displacement in the axial direction, the trunnion 7 starts displacement in the direction opposite that in which it has been displacing, toward the neutral position. However, the trunnion 7 continues swinging around the pivot shaft 9 as long as there exists a displacement from the neutral position. As a result, a displacement of the precess cam 18 in a circumferential direction of a cam surface 21 is transmitted to the spool 15 via the link arm 19, to thus displace the spool 15 in the axial direction. Then, under a state where the inclination angle of the trunnion 7 reaches a predetermined angle corresponding to the desired transmission ratio, the control valve 12 is closed simultaneously with the trunnion 7 returning to the neutral position. Hence, supply and discharge of the pressurized oil to and from the actuators 10, 10 is stopped. As a result, the inclination angle of the trunnion 7 becomes an angle corresponding to the amount of displacement of the sleeve 14 in the axial direction displaced by the stepping motor 13.

During operation of the toroidal continuously variable transmission such that as described above, the input disc 2 (the left-hand input disc 2 in FIGS. 7 and 8) is driven and rotated by a driving shaft 22 that is connected with a power source such as an engine via a hydraulic loader 23 as shown in FIGS. 7 and 8. As a result, the pair of the input discs 2, 2 supported on the respective end portions of the input shaft 1 rotate synchronously while being pressed in a direction approaching toward each other. Then, the rotational movement is transmitted to the output discs 5, 5, via the power rollers 6, 6, and output from the output gear 4.

As described above, when the power is transmitted from the input discs 2, 2 to the output discs 5, 5, a force is applied on the trunnions 7, 7 in a direction along the pivot shafts 9, 9, which are provided on respective ends of the trunnions 7, 7, due to friction on rolling contact portions (i.e., traction portions) between the peripheral surfaces of the power rollers 6, 6 supported on the inner surfaces, and the inner surfaces of the discs 2, 5. This force is referred to as a 2Ft, and the magnitude of the force is proportional to a torque transmitted from each of the input side discs 2, 2 to each of the output side discs 5, 5 (or from the output side discs 5, 5 to the input side discs 2, 2). Such a force 2Ft is supported by the actuators 10, 10. Therefore, during operation of the toroidal continuously variable transmission, a pressure differential between a pair of oil pressure chambers 24a and 24b provided on respective sides of the pistons 16, 16 constituting the actuators 10, 10 is proportional to the magnitude of the force 2Ft.

In the case where rotational speeds of the input shaft 1 and the output gear 4 are changed, when deceleration is performed between the input shaft 1 and the output gear 4 first, the trunnions 7, 7 are moved in the axial directions of the pivot shafts 9, 9 by the actuators 10, 10, thereby swinging the trunnions 7, 7 to a position shown in FIG. 8. Then, as shown in FIG. 8, the peripheral surfaces of the power rollers 6, 6 abut against portions of the inner surfaces of the input discs 2, 2 near the center and portions of the inner surfaces 4a of the output discs 5, 5 near the outer periphery, respectively. In contrast, at the time of increasing the speed, the trunnions 7, 7 are made swung in the opposite direction to that shown in FIG. 8. Accordingly, the trunnions 7, 7 are inclined so that, in the reverse state of that shown in FIG. 8, the peripheral surfaces of the power rollers 6, 6 abut against areas located slightly toward the outer peripheries of the inner surfaces of the input discs 2, 2 and areas located slightly toward the centers of the inner surface of the output discs 5, 5, respectively. When the inclination angle of the trunnions 7, 7 is set at an intermediate angle between the above two angles, an intermediate transmission ratio (speed ratio) can be obtained between the input shaft 1 and the output gear 4.

Further, for the case where the toroidal continuously variable transmission which is constituted and functions as described above is incorporated into an actual continuously variable transmission for a vehicle, there has been previously proposed combining the transmission with a differential unit such as a planetary gear mechanism to thereby constitute a continuously variable transmission apparatus. For example, U.S. Pat. No. 6,251,039 discloses a so-called geared-neutral-type continuously variable transmission apparatus which can switch rotation of an output shaft between forward and reverse with a stop state interposed therebetween while an input shaft rotates in a single direction. FIG. 10 shows the continuously variable transmission apparatus disclosed in U.S. Pat. No. 6,251,039. The continuously variable transmission apparatus is constituted by combining a toroidal continuously variable transmission 25 and a planetary-gear-type transmission 26. The toroidal continuously variable transmission 25 is provided with an input shaft 1, a pair of input discs 2, 2, an output disc 5a, and a plurality of power rollers 6, 6. In the example shown in FIG. 10, the output discs 5a is constituted such that outer surfaces of the pair of output discs abut each other to be formed integrally.

The planetary-gear-type transmission 26 is provided with a carrier 27 which is fixedly connected on the input shaft 1 and one of the input discs 2 (the right-hand input disc in FIG. 10). A first transmission shaft 29 is rotatably supported on an intermediate portion in the radial direction of the carrier 27, and planetary gear elements 28a, 28b are fixedly disposed on respective end portions of the first transmission shaft 29. Further, a second transmission shaft 31 is rotatably supported, with the carrier 27 disposed between the second transmission shaft 31 and the input shaft 1 concentrically with the input shaft 1, and sun gears 30a, 30b fixedly disposed on respective ends of the second transmission shaft 31. Furthermore, the planetary gear elements 28a is meshed with a sun gear 33 which is fixedly disposed on a tip portion of a hollow rotary shaft 32 whose base portion (the left end portion in FIG. 10) is connected to the output disc 5a, and/or the planetary gear element 28b is meshed with the sun gear 30a which is fixedly disposed on one end portion (the left end portion in FIG. 10) of the second transmission shaft 31. The planetary gear element 28a (the left-hand element in FIG. 10) is also meshed with a ring gear 35 which is rotatably provided around the carrier 27 via another planetary gear element 34.

Meanwhile, planetary gear elements 37a, 37b are rotatably supported on a second carrier 36 which is provided around the sun gear 30b which is fixedly disposed on the other end portion (the right end portion in FIG. 10) of the second transmission 31. The second carrier 36 is fixedly disposed on a base end portion (the left end portion in FIG. 10) of an output shaft 38 which is provided concentrically with the input shaft 1 and the second transmission shaft 31. The planetary gear elements 37a, 37b are meshed with each other. Further, the planetary gear element 37a, one of the planetary gear elements, is meshed with the sun gear 30b. The other planetary gear element 37b is meshed with a second ring gear 39 which is rotatably provided around the second carrier 36. The ring gear 35 and the second carrier 36 are allowed to engage and disengage by way of a low-speed clutch 40. The second ring gear 39 and a stationary portion such as a housing are allowed to engage and disengage by way of a high-speed clutch 41.

In the case of the continuously variable transmission apparatus shown in FIG. 10 described above, under a so-called low-speed mode where the high-speed clutch 41 is disengaged simultaneously with engagement of the low-speed clutch 40, the power of the input shaft 1 in transmitted to the output shaft 38 via the ring gear 35. By changing the transmission ratio of the toroidal continuously variable transmission 25, the overall transmission ratio of the continuously variable transmission apparatus; that is, the transmission ratio between the input shaft 1 and the output shaft 38, is changed. Under such a low-speed mode, the overall transmission ratio of the continuously variable transmission apparatus changes infinitely. In other words, by adjusting the transmission ratio of the toroidal continuously variable transmission 25, a rotation state of the output shaft can be switched between forward and reverse with a stop state interposed therebetween while the input shaft rotates in a single direction.

During acceleration or during constant-speed driving under such a low speed mode, a torque passing through the toroidal continuously variable transmission 25 (hereinafter referred to as "passing torque") is applied on the output disc 5*a* from the input shaft 1 via the carrier 27, the first transmission shaft 29, the sun gear 33, and the hollow rotary shaft 32. Further, the torque is applied on the input discs 2, 2 from the output disc 5*a* via the power rollers 6, 6. In other words, the torque passing through the toroidal continuously variable transmission 25 is circulated in a direction where the input discs 2, 2 receive torque from the power rollers 6, 6 during acceleration or constant-speed driving.

In contrast to the above, under a so-called high-speed mode where the low-speed clutch 40 is disengaged and the high-speed clutch 41 is engaged, the power of the input shaft 1 is transmitted to the output shaft 38 via the first and second transmission shafts 29, 31. By changing the transmission ratio of the toroidal continuously variable transmission 25, the overall transmission ratio of the continuously variable transmission apparatus is changed. In the above case, the higher the transmission ratio of the toroidal continuously variable transmission 25, the higher the overall transmission ratio of the continuously variable transmission apparatus.

Note that the torque passing through the toroidal continuously variable transmission 25—during acceleration or constant—speed driving under such a high speed mode—is applied in a direction where the input discs 2, 2 add torque on the power rollers 6, 6.

For example, in the case of a continuously variable transmission apparatus having such a structure as shown in FIG. 10 and capable of implementing a so-called infinitely variable transmission ratio where the output shaft 38 is stopped while the input shaft 1 rotates, it is important to maintain a torque applied on the toroidal continuously variable transmission 25 at an appropriate value under a state where the output shaft 38 is stopped and the transmission ratio is drastically increased, in view of ensuring durability and easy operability of the toroidal continuously variable transmission 25. The reason for the above is as follows. As is clear from a relation of "rotational driving power=rotation speed×torque," under a state where the transmission ratio is extremely high and the output shaft 38 stops, or rotates at a very low speed, with the input shaft 1 rotating, the torque passing through the toroidal continuously variable transmission 25 (passing torque) becomes larger than the torque applied on the input shaft 1. Therefore, in order to secure durability of the toroidal continuously variable transmission 25 without upsizing the toroidal continuously variable transmission 25, there must be adopted strict control for confining the torque within a range of appropriate values. More specifically, a control inclusive of a driving source is required for stopping the output shaft 38 while minimizing a torque input onto the input shaft 1.

Meanwhile, under a state where the transmission ratio is extremely high, the torque applied on the output shaft 38 changes to a large extent even when the transmission ratio of the toroidal continuously variable transmission 25 is changed slightly. Accordingly, unless the transmission ratio of the toroidal continuously variable transmission 25 is adjusted strictly, the driver may experience an uncomfortable feeling, or drivability may be poor. For example, in the case of an automatic transmission for a vehicle, a stopping state is sometimes maintained while the driver steps on the brake during a vehicle stop. Under such a state, when the transmission ratio of the toroidal continuously variable transmission 25 is not adjusted strictly and a large torque is applied on the output shaft 38, a force required for stepping on the brake pedal during the vehicle stop becomes larger, thereby increasing driver fatigue. Meanwhile, when the transmission ratio of the toroidal continuously variable transmission 25 is not adjusted strictly and too small a torque is applied on the output shaft 38, vehicle start may fail to be smooth, or the vehicle may roll in reverse while starting on an uphill grade. Therefore, during a vehicle stop or very low speed driving, strict adjustment of the transmission ratio of the toroidal continuously variable transmission 25 is required in addition to control of the torque transmitted from the driving source to the input shaft 1.

In consideration of the above, JP-A-10-103461 discloses a structure where the torque passing through the toroidal continuously variable transmission (passing torque) is regulated directly through control of a pressure differential between hydraulic actuator which are used for displacing trunnions.

However, in the case of the structure disclosed in JP-A-10-103461, because the control relies on only a pressure differential, stopping a posture of the trunnion at the moment when the passing torque has reached the desired value is difficult. More specifically, because a displacement amount of the trunnion becomes large in order to control the torque, there easily occurs so-called overshoot (and hunting resulting from the overshoot). . . where the trunnion continues displacement without stopping at the moment when the passing torque becomes coincident with the target value. Hence, control of the passing torque is not stable.

In particular, the overshoot is easily introduced in a case of a toroidal continuously variable transmission 25 of a so-called "without cast angle type," as in the case of general half-toroidal continuously variable transmissions shown in FIGS. 7 through 9, wherein a direction along the pivot shafts 9, 9 which are provided on both end portions of the trunnions 7, 7 and a direction of center shafts of the input and output discs 2, 5 are perpendicular to each other. In contrast, in a case of a continuously variable transmission whose structure includes a cast angle as in the case of a general full-toroidal continuously variable transmission, a force in a direction of converging an overshoot acts thereon. Therefore, sufficient torque control is conceivably performed even with the structure disclosed in the above-cited JP-A-10-103461.

In view of the above circumstances, there can be conceived a control method or a control device with which a torque passing through the toroidal continuously variable transmission (passing torque) can be controlled strictly even in the case of a continuously variable transmission apparatus including a toroidal continuously variable transmission without cast angle, as in the case of a general half-toroidal continuously variable transmission.

FIG. 11 shows an example structure of a continuously variable transmission apparatus having such a control method and a control device as described above. The continuously variable transmission apparatus shown in FIG. 11 has a function similar to that of a conventionally known continuously variable transmission apparatus shown in the above-cited FIG. 10; however, assembly of the planetary-gear-type transmission 26a portion is improved by contriving a structure of the planetary-gear-type transmission 26a portion.

First and second planetary gears 42, 43, both being of double pinion type, are supported on respective sides of a carrier 27a which is rotated together with the input shaft 1 and the pair of input discs 2, 2. That is, the first planetary gear 42 is constituted of a pair of planetary gear elements 44a, 44b, and the second planetary gear 43 is constituted of a pair of planetary gear elements 45a, 45b. The planetary gear elements 44a, 44b are meshed with each other, as are the planetary gear elements 45a, 45b. Further, the planetary gears elements 44a, 45a on the inner periphery are meshed with first and second sun gears 47, 48, respectively, which are fixedly disposed on a tip portion (the right end portion in FIG. 11) of a hollow rotary shaft 32a whose base portion (the left end portion in FIG. 11) is connected to the output disc 5a, and on one end portion (the left end portion in FIG. 11) of a transmission shaft 46. The planetary gear elements 44b, 45b on the outer periphery are meshed with a ring gear 49.

Meanwhile, planetary gear elements 51a, 51b are rotatably supported on a second carrier 36a which is provided around a third sun gear 50—which is fixedly disposed on the other end portion (the right end portion in FIG. 11) of the transmission shaft 46. The second carrier 36a is fixedly disposed on the base end portion (the left end portion in FIG. 11) of an output shaft 38a, which is concentrically provided with the input shaft 1. The planetary gear elements 51a, 51b are meshed with each other. Further, the planetary gear element 51a on the inner periphery side is meshed with the third sun gear 50, and the planetary gear element 51b on the outer periphery side is meshed with a second ring gear 39a, which is rotatably provided around the second carrier 36a. The ring gear 49 and the second carrier 36a are allowed to engage and disengage by way of a low-speed clutch 40a. The second ring gear 39a and a stationary portion such as a housing are allowed to engage and disengage by way of a high-speed clutch 41a.

In the case of an improved continuously variable transmission apparatus structured as described above, under a state where the high-speed clutch 41a is disengaged simultaneously with engagement of the low-speed clutch 40a, the power of the input shaft 1 is transmitted to the output shaft 38a via the ring gear 49. By changing the transmission ratio of the toroidal continuously variable transmission 25, an overall speed ratio $e_{CVT}$ of the continuously variable transmission apparatus; that is, a speed ratio between the input shaft 1 and the output shaft 38a, is changed. In the above case, a relationship between the speed ratio (i.e., the transmission ratio) $e_{CVU}$ of the toroidal continuously variable transmission 25 and the overall speed ratio $e_{CVT}$ of the continuously variable transmission apparatus, where a ratio between a number of teeth $m_{49}$ of the ring gear 49 and a number of teeth $m_{47}$ of the first sun gear 47 is set at $i_1$ ($=m_{49}/m_{47}$), can be represented by the following Equation 1.

$$e_{CVT}=(e_{CVU}+i_1-1)/i_1 \qquad (1)$$

In the case where, for example, the ratio $i_1$, the numbers of teeth, is 2, the relationship between the two speed ratios of $e_{CVU}$ and $e_{CVT}$ changes as shown by a line α in FIG. 12.

Meanwhile, under a state where the low-speed clutch 40a is disengaged and the high-speed clutch 41a is engaged, the power of the input shaft 1 is transmitted to the output shaft 38a via the first planetary gear 42, the ring gear 49, the second planetary gear 43, the transmission shaft 46, the planetary gear elements 51a, 51b, and the second carrier 36a. By changing the speed ratio $e_{CVU}$ of the toroidal continuously variable transmission 25, the overall speed ratio $e_{CVT}$ of the continuously variable transmission apparatus is changed. A relationship in the above case between the speed ratio $e_{CVU}$ of the toroidal continuously variable transmission 25 and the overall speed ratio $e_{CVT}$ of the continuously variable transmission apparatus can be represented by the following Equation 2. In Equation 2, $i_1$ represents a ratio ($=m_{49}/m_{47}$) between the number of teeth $m_{49}$ of the ring gear 49 and the number of teeth $m_{47}$ of the first sun gear 47, $i_2$ represents a ratio ($=m_{49}/m_{48}$) between the number of teeth $m_{49}$ of the ring gear 49 and a number of teeth $m_{48}$ of the second sun gear 48, and $i_3$ represents a ratio between a number of teeth $m_{39}$ of the second ring gear 39a and a number of teeth $m_{50}$ of the third sun gear 50 ($=m_{39}/m_{50}$).

$$e_{CVT}=\{1/(1-i_3)\}\cdot\{1+(i_2/i_1)(e_{CVU}-1)\} \qquad (2)$$

In the case where the ratio $i_1$ is 2, $i_2$ is 2.2, and $i_3$ is 2.8, the relationship between the two speed ratios of $e_{CVU}$ and $e_{CVT}$ changes as shown by a line β in FIG. 12.

As is clear from the line α in FIG. 12, a continuously variable transmission apparatus which is constituted and functions in the aforesaid manner can realize a so-called infinitely variable transmission ratio state where the output shaft 38a is stopped while the input shaft 1 rotates. However, as mentioned previously, under such a state where the output shaft 38 is stopped or driven at a very low speed while the input shaft 1 rotates, the torque passing through the toroidal continuously variable transmission 25 (i.e., passing torque) becomes greater than a torque applied on the input shaft 1 from the engine which is the driving source. For this reason, the torque which is input from the driving source into the input shaft 1 must be regulated properly during a vehicle stop or during very low speed driving in order to prevent the passing torque from becoming excessively large (or excessively small).

Further, during the very low speed driving, under a state where the output shaft 38a is almost stopped; in other words, under a state where the transmission ratio of the continuously variable transmission apparatus is significantly large and the rotation speed of the output shaft 38a is significantly slower than that of the input shaft 1, the torque applied on the output shaft 38a fluctuates to a large extent upon a slight fluctuation in the transmission ratio of the continuously variable transmission apparatus. Therefore, the torque which is input also from the driving source to the input shaft 1 must be regulated properly in order to secure smooth drivability.

During acceleration or constant-speed driving under such a low-speed mode, the torque is, as is the case with the conventional structure shown in the aforementioned FIG. 10, applied on the output disc 5a from the input shaft 1 via the carrier 27a, the first planetary gear 42, the first sun gear 47, and the hollow rotary shaft 32a. Further, the torque is applied on the input discs 2, 2 from the output disc 5a via the power rollers 6, 6 (see FIG. 10). In other words, the passing torque is circulated in a direction where the input discs 2, 2 receive torque from the power rollers 6, 6 during acceleration or constant-speed driving.

For this reason, as shown in FIG. 13, a control method and a control apparatus according to the above constitution are arranged such that the torque input from the driving source into the input shaft 1 is regulated properly. First, a rotation speed of the engine which serves as a driving source is controlled roughly. Specifically, the rotation speed of the engine is regulated to a point "a" in the range of "w" of FIG. 13. In conjunction with the above, there is set the transmission ratio of the toroidal continuously variable transmission 25 which is required for matching a rotation speed of the input shaft 1 of the continuously variable transmission apparatus with the controlled rotation speed of the engine. This setting is to be operated according to the above-mentioned Equation 1. That is, the torque transmitted from the engine to the input shaft 1 must be strictly regulated in the case of a so-called low-speed mode where the low-speed clutch 40a is engaged and the high-speed clutch 41a is disengaged. Therefore, the transmission ratio of the toroidal continuously variable transmission 25 is to be set, according to Equation 1, such that the rotation speed of the input shaft 1 corresponds to the required rotation speed of the output shaft 38a.

Meanwhile, a pressure differential between the oil pressure chambers 24a, 24b (see FIG. 9 and FIG. 15 described later) incorporated in the hydraulic actuators 10, 10—used for displacing the trunnions 7, 7 incorporated in the toroidal continuously variable transmission 25 in the direction along the pivot shafts 9, 9—is measured with an oil pressure sensor 52 (see FIG. 2, described later). The oil pressure is measured under a state where the rotation speed of the engine is roughly controlled (however, the rotation speed must be maintained constant) and, corresponding thereto, the transmission ratio of the toroidal continuously variable transmission 25 is set according to Equation 1 in the manner described above. Then, the torque passing through the toroidal continuously variable transmission 25 (passing torque) $T_{CVU}$ is calculated from the oil pressure differential obtained from the measurement.

Specifically, so long as the transmission ratio of the toroidal continuously variable transmission 25 is constant, the oil pressure differential is proportional to the torque $T_{CVU}$ passing through the toroidal continuously variable transmission 25. Accordingly, the torque $T_{CVU}$ can be calculated from the above oil pressure differential. The reason for this is as follows. As described above, the actuators 10, 10 support a force of so-called 2Ft having a magnitude proportional to the torque (i.e., the torque $T_{CVU}$ passing through the toroidal continuously variable transmission 25) transmitted from the input discs 2, 2 to the output disc 5a (or from the output discs 5a to the input discs 2, 2).

Meanwhile, the torque $T_{CVU}$ can be obtained from Equation 3 below.

$$T_{CVU} = e_{CVU} \cdot T_{IN} / \{e_{CVU} + (i_1 - 1)\eta_{CVU}\} \quad (3)$$

In Equation 3, $e_{CVU}$ represents a speed ratio of the toroidal continuously variable transmission 25, $T_{IN}$ represents the torque input from the engine to the input shaft 1, $i_1$ represents a teeth number ratio of planetary-gear-type transmission pertaining to the first planetary gear 42 (i.e., a ratio between the number of teeth $m_{49}$ of the ring gear 49 and the number of teeth $m_{47}$ of the first sun gear 47), and $\eta_{CVU}$ represents efficiency of the toroidal continuously variable transmission 25.

Here, a deviation $\Delta T$ (= $T_{CVU1} - T_{CVU2}$) is obtained from $T_{CVU1}$, which is the torque actually passing through the toroidal continuously variable transmission 25 as obtained from the above oil pressure differential and the target passing torque $T_{CVU2}$ obtained from Equation 3. Then, the speed ratio of the toroidal continuously variable transmission 25 is adjusted in a direction where the deviation $\Delta T$ is eliminated (i.e., where $\Delta T$ becomes zero). Note that because the deviation of the torque $\Delta T$ and a deviation of the oil pressure differential are in a proportional relationship, the adjustment of the transmission ratio can be performed either by the deviation of the torque or by the deviation of the oil pressure differential. In other words, from the technical point of view, control of the transmission ratio based on the deviation of the torque is identical with control of the transmission ratio based on the deviation of the oil pressure differential.

As an example, the following is conceived under the assumption that, within the range where the actual torque $T_{CVU1}$ (measured value) passing through the toroidal continuously variable transmission 25 is restricted to the target value $T_{CVU2}$ as shown in FIG. 13, a torque $T_{IN}$ with which the engine drives the input shaft 1 changes in such a sharply decreasing direction that the rotation speed of the input shaft 1 is increased. Such characteristics of the engine can be easily obtained even in a low-speed rotation range when the engine is electronically controlled. In a case where the engine has such characteristics and where the measured torque value $T_{CVU1}$ has a deviation from the target torque value $T_{CVU2}$ in the direction in which the input discs 2, 2 receive torque from the power rollers 6, 6 (see FIGS. 8 through 10), the overall transmission ratio of the continuously variable transmission apparatus is displaced to the deceleration side so as to increase the rotation speed of the engine to thereby reduce the torque $T_{IN}$ which drives the input shaft 1. To achieve the above, the transmission ratio of the toroidal continuously variable transmission 25 is changed to the acceleration side.

However, under a vehicle stop state where the driver steps on a brake pedal (i.e., a state where the rotation speed of the output shaft is zero), the transmission ratio of the toroidal continuously variable transmission 25 is controlled within a range where the adjusted force can be absorbed by a slip generated in the toroidal continuously variable transmission 25; that is, a slip (creep) generated on the contact portions (i.e., traction portion) of the inner surfaces of the input and output discs 2, 5a and the peripheral surfaces of the power rollers 6, 6 (see FIGS. 8 through 10). Therefore, an allowable range for adjusting the speed ratio is limited to a range where strain is not applied on the contact portions, which is a stricter limitation than that imposed in the case of low-speed driving.

For example, when the target value $T_{CVU2}$ is at point "a" and the measured value $T_{CVU1}$ is at point "b" in FIG. 13, the input discs 2, 2 have deviation in a direction receiving a torque from the power rollers 6, 6. Here, the speed ratio $e_{CVU}$ of the toroidal continuously variable transmission 25 is changed to the acceleration side so that the overall speed ratio $e_{CVT}$ of the continuously variable transmission apparatus (T/M) is changed to the deceleration side. A rotation speed of the engine is increased in conjunction with the above so as to lower the torque. In contrast, when the measured value $T_{CVU1}$ is at point "c" in FIG. 13, the input discs 2, 2 have deviation in a direction where torque is added on the power rollers 6, 6. In the case where $T_{CVU1}$ is at point "c," reverse to the case where $T_{CVU1}$ is at the point "b," the speed ratio $e_{CVU}$ of the toroidal continuously variable transmission 25 is changed to the deceleration side so that the overall speed ratio $e_{CVT}$ of the continuously variable transmission apparatus (T/M) is changed to the acceleration side. The rotation speed of the engine is decreased in conjunction with the above so as to increase the torque.

The above-mentioned operations are repeated until the torque $T_{CVU1}$ actually passing through the toroidal continuously variable transmission 25 as obtained from the oil pressure differential matches the target value. In other words, the above-mentioned operations are repeated in the case where the torque $T_{CVU1}$ passing through the toroidal continuously variable transmission 25 cannot be matched with the target value $T_{CU2}$ through only one iteration of transmission gear control of the toroidal continuously variable transmission 25. As a result, the torque $T_{IN}$ with which the engine rotates and drives the input shaft 1 can be set closer to a value which allows the torque $T_{CVU}$ passing through the toroidal continuously variable transmission 25 to reach the target value $T_{CVU2}$.

Note that the above operations are performed automatically and in a short period of time through instructions from a microcomputer which is incorporated in a controller of the continuously variable transmission apparatus.

FIG. 14 shows relationships among a ratio (the left-handed vertical axis) of the torque $T_{CVU}$ passing through the toroidal continuously variable transmission 25 and the torque $T_{IN}$ with which the engine rotates and drives the input shaft 1, an overall speed ratio $e_{CVT}$ (horizontal axis) of the continuously variable transmission apparatus, and a speed ratio $e_{CVU}$ (the right-handed vertical axis) of the toroidal continuously variable transmission 25. The solid line "a" shows a relationship between the ratio of the passing torque $T_{CVY}$ to the driving torque $T_{IN}$ and the overall speed ratio $e_{CVT}$ of the continuously variable transmission apparatus, and the dotted line "b" shows a relationship between the two speed ratios $e_{CVT}$ and $e_{CVU}$. The above constitution regulates the speed ratio $e_{CVU}$ of the toroidal continuously variable transmission 25 so as to regulate the torque $T_{CVU1}$ actually passing through the toroidal continuously variable transmission 25 to the target value ($T_{CVU2}$) represented by points on the solid line "a" under a state where the overall speed ratio $e_{CVT}$ of the continuously variable transmission apparatus is regulated to a predetermined value.

In the above constitution, control for regulating the torque $T_{CVU1}$ actually passing through the toroidal continuously variable transmission 25 to the point on the solid line "a," which is the target value $T_{CVU2}$, is performed in two stages. Specifically, the rotation speed of the engine is roughly controlled to a specific rotation speed; that is, to a value assumed to provide the target value $T_{CVU2}$. Thereafter, the transmission ratio of the toroidal continuously variable transmission 25 is controlled in conjunction with the rotation speed thereof. For this reason, in contrast to the case of a conventional method, the torque $T_{CVU1}$ actually passing through the toroidal continuously variable transmission 25 can be regulated to the target value $T_{CVU2}$ without introducing an overshoot (and resultant hunting), or even when introduced, the overshoot is suppressed within such a level that would not raise any problems in practical use.

Note that, as described above, under a state of a vehicle stop with the driver stepping on a brake pedal, a driving force (torque) is applied on the output shaft 38a (FIG. 10) based on the slip generated within the toroidal continuously variable transmission 25. The magnitude of the torque may be set to a value which corresponds to a creep torque generated in a general automatic transmission provided with a torque converter. The reason for this is to avoid providing an uncomfortable feeling to a driver who is accustomed to operations of a general automatic transmission. In addition, a direction of the torque is determined by a position of a control lever provided at a driver's seat. When a forward direction (D range) is selected by the control lever, a torque of a forward direction is applied on the output shaft 38a. When a reverse (R range) is selected, a torque of reverse direction is applied.

Next, a circuit in a section which controls the speed ratio of the toroidal continuously variable transmission 25 so that the torque $T_{CVU1}$ actually passing through the toroidal continuously variable transmission 25 matches the target value $T_{CVU2}$ will be described with reference to FIG. 15. By way of the control valve 12a, pressurized oil can be supplied to and discharged from the pair of oil pressure chambers 24a, 24b included in the hydraulic actuators 10, 10 which are used for displacing the trunnions 7, 7 in the axial direction (in the vertical direction in FIG. 15) of pivot shafts 9, 9 (see FIG. 9). The sleeve 14 constituting the control valve 12 is allowed to displace in the axial direction by a stepping motor 13 via a link arm 54 and a rod 53. The spool 15 constituting the control valve 12 is engaged with the trunnion 7 via the link arm 19, the precess cam 18, and the rod 17. The spool 15 is allowed to displace in the axial direction in conjunction with a displacement in the axial direction and a swing of the trunnion 7. The above constitution is principally the same as that of a conventionally known toroidal continuously variable transmission.

The above constitution is particularly arranged such that the sleeve 14, driven by the stepping motor 13, can also be driven by a hydraulic differential pressure cylinder 55. Specifically, a tip portion of the rod 53 whose base end portion is connected to the sleeve 14 is pivotally supported by an intermediate portion of the link arm 54. Further, pins provided at output portions of the stepping motor 13 or the differential pressure cylinder 55 are engaged with elongated holes provided on respective end portions of the link arm 54. When one pin in the elongated hole provided on one of the two end portions of the link arm 54 is pushed or pulled, the other pin in the elongated hole on the other end portion serves as a pivot. According to such a constitution, the sleeve 14 can be displaced in the axial direction not only by the stepping motor 13 but also by the differential pressure cylinder 55. The above constitution is arranged such that the speed ratio $e_{CVU}$ of the toroidal continuously variable transmission 25 can be adjusted by a displacement of the sleeve 14 caused by the differential pressure cylinder 55 depending on the torque $T_{CVU}$ passing through the toroidal continuously variable transmission 25.

In order to achieve the above, the constitution is arranged such that different oil pressures can be induced into a pair of oil pressure chambers 56a, 56b provided in the differential pressure cylinder 55 via a correcting control valve 57. Oil pressures introduced into the oil pressure chambers 56a, 56b are determined from a pressure differential $\Delta P$ between oil pressures $P_{DOWN}$ and $P_{UP}$ which act in the pair of oil pressure chambers 24a, 24b constituting the actuator 10; and a pressure differential $\Delta P_O$ between output pressures of a pair of solenoid valves 58a and 58b used for adjusting opening of the correcting control valve 57. Specifically, opening and closing of the two solenoid valves 58a, 58b are calculated by an unillustrated control device (hereinafter referred to as "controller"), and controlled on the basis of an output signal output from the controller such that the pressure differential $\Delta P_O$ between the output pressures of the two solenoid valves 58a and 58b reaches a target pressure differential corresponding to the target torque $T_{CVU2}$ of the toroidal continuously variable transmission 25. Accordingly, the following forces act on a spool 59 constituting the correcting control valve 57: a force corresponding to the pressure differential $\Delta P$ between oil pressures acting on the oil pressure chambers 24a, 24b of the actuator 10; and a pressure differential $\Delta P_O$—between the output pressures of the solenoid valves 58a, 58b—which is the target pressure differential corresponding to the target torque $T_{CVU2}$; that is, counterforce against $\Delta P$.

In the case where the torque $T_{CVU1}$ actually passing through the toroidal continuously variable transmission 25 is identical with the target torque $T_{CVU2}$; that is, in the case where a difference $\Delta T$ between the passing torque $T_{CVU1}$ and the target torque $T_{CVU2}$ is zero, the force corresponding to the pressure differential $\Delta P$ between oil pressures acting on the oil pressure chambers 24a, 24b of the actuator 10 and the force corresponding to the pressure differential $\Delta P_O$ between the output pressures of the solenoid valves 58a, 58b are balanced. For this reason, the spool 59 constituting the correcting control valve 57 is brought into a neutral position, and the pressures acting on the oil pressure chambers 56a, 56b of the differential pressure cylinder 55 become equal to each other. Under the above state, a spool 60 of the differential pressure cylinder 55 is brought into a neutral position, and the speed ratio of the toroidal continuously variable transmission 25 remains unchanged (not corrected).

Meanwhile, when a difference arises between the torque $T_{CVU1}$ actually passing through the toroidal continuously variable transmission 25 and the target torque $T_{CVU2}$, balance is lost between the force corresponding to the pressure differential $\Delta P$ between the oil pressures acting on the oil pressure chambers 24a, 24b of the actuator 10 and the force corresponding to the pressure differential $\Delta P_O$ between the output pressures of the solenoid valves 58a, 58b. Then, according to a magnitude and direction of the difference $\Delta T$ between the passing torque $T_{CVU1}$ and the target torque $T_{CVU2}$, the spool 59 constituting the correcting control valve 57 is displaced in the axial direction, to thus induce an oil pressure corresponding to the magnitude and direction of $\Delta T$ into the oil pressure chambers 56a, 56b of the differential pressure cylinder 55. Then, the spool 60 of the differential pressure cylinder 55 is displaced in the axial direction, whereby the sleeve 14 constituting the control valve 12 is displaced in the axial direction. Consequently, the trunnions 7, 7 are displaced in the direction along the pivot shafts 9, 9 to thus change (correct) the speed ratio of the toroidal continuously variable transmission 25. Note that the direction and the amount of the displacement of the speed ratio in relation to the above is the same as described with reference to the aforementioned FIGS. 13 and 14. The amount of displacement of the speed ratio; that is, the amount to be corrected (i.e., amount to be corrected in relation to the speed ratio) of the toroidal continuously variable transmission 25 in relation to the above is sufficiently small as compared with a speed ratio width of the toroidal continuously variable transmission 25. For this reason, a stroke of the spool 60 of the differential pressure cylinder 55 is designed so as to be sufficiently smaller than a stroke of an output portion of the stepping motor 13.

In the case where the conventional continuously variable transmission apparatus shown in FIG. 10 or the structure shown in FIG. 11 is employed as an actual automatic transformer of a vehicle, when a non-travel range is selected with a shift lever provided at a driver's seat, each of low-speed clutches 40, 40a and high-speed clutches 41a, 41b are arranged to be disengaged. Specifically, in the case where the shift lever is in a neutral range (N range) or in a parking range (P range)—each used for selecting a state where a vehicle is not allowed to drive—each of the clutches 40, 40a, 41a, and 41b is disengaged. As a result, the torque passing through the toroidal continuously variable transmission 25 and the planetary-gear-type transmission 26, 26a becomes quite small (substantially zero). Accordingly, durability of the toroidal continuously variable transmission 25 and the planetary-gear-type transmission 26, 26a can be secured.

However, in such a state where each of the clutches 40, 40a, 41a, 41b is disengaged and the torque passing through the toroidal continuously variable transmission 25 becomes quite small, the correction of the speed ratio of the toroidal continuously variable transmission 25 according to FIGS. 13 and 14 cannot be performed accurately. More specifically, the speed ratio may be corrected excessively because of a failure to control the transmission ratio (speed ratio) based on the torque passing through the toroidal continuously variable transmission 25. Further, under such a state that the speed ratio is corrected excessively, when a travel range (drive range or a reverse range) is selected with a shift lever, an excessive torque may be applied on the output shaft 38, 38a at a moment when the low-speed clutch 40, 40a is engaged. When an excessive torque is applied on the output shaft 38, 38a in this manner, a driver may feel undesirably uncomfortable feeling at a vehicle start.

SUMMARY OF THE INVENTION

The present invention has been conceived in view of the above-mentioned problems, and provides a continuously variable transmission apparatus which does not provide a driver with an uncomfortable feeling, because unnecessary control of a transmission ratio is hindered.

The invention provides a continuously variable transmission apparatus, including: an input shaft rotated and driven by a driving source; an output shaft; a toroidal continuously variable transmission; a gear-type differential unit including a plurality of gears; and a controller for controlling change of a transmission ratio of the toroidal continuously variable transmission. The toroidal continuously variable transmission includes: an input disc rotated and driven by the input shaft, an output disc supported so as to be relatively rotatable with respect to the input disc, a plurality of power rollers interposed between the input disc and the output disc, a plurality of support members rotatably supporting the respective power rollers, and an actuator having a pair of oil pressure chambers and displacing the support members so as to change the transmission ratio between the input disc and the output disc. The differential unit includes: a first input portion rotated and driven by the input shaft together with the input disc, and a second input portion connected to the output disc. A rotational movement which is obtained in accordance with a speed differential between the first and the second input portions is taken out and transmitted to the output shaft. The controller performs the following functions (1) through (3): (1) a function of adjusting the transmission ratio of the toroidal continuously variable transmission so as to change a relative displacement speed of the plurality of gears contained in the planetary-gear-type transmission, thereby converting the rotational condition of the output shaft between a forward-rotating condition and a reverse-rotating condition through a non-rotational condition while the input shaft is kept rotating in a single direction; (2) a function of measuring a differential pressure between a pair of chambers constituting an actuator so as to calculate a torque actually passing through the toroidal continuously variable transmission; thereafter obtaining a deviation, from a target value, of the torque actually passing through the toroidal continuously variable transmission; and thereby adjusting the transmission ratio of the toroidal continuously variable transmission so that the torque passing through a toroidal continuously variable transmission attains a target value, and (3) a function of stopping the above function (2) in the case where the torque passing through the toroidal continuously variable transmission fails to become stable.

In the case of a continuously variable transmission apparatus constituted as described above, when a travel state is selected so as to stop a vehicle or to drive at a low speed, as in the case of the constitution of FIG. 11 described hitherto, a transmission ratio (speed ratio) of a toroidal continuously variable transmission is adjusted so as to regulate a torque passing through the toroidal continuously variable transmission to thus prevent providing an uncomfortable feeling to a driver. Further, in the case where a non-travel state is selected, or immediately after that a travel state is selected from a non-travel state, when the torque passing through the toroidal continuously variable transmission 25a fails to become stable, control of the transmission ratio of the toroidal continuously variable transmission is stopped. Therefore, the transmission ratio of the toroidal continuously variable transmission is prevented from being excessively corrected, and the continuously variable transmission apparatus is prevented from providing an uncomfortable feeling to a driver because an excessive torque is transmitted to an output shaft when switched to a travel state.

BRIEF DESCRIPTION OF THE DRAWINGS

The present invention may be more readily described with reference to the accompanying drawings, in which.

DETAILED DESCRIPTION OF THE PREFERRED EMBODIMENTS

There will now be described an embodiment which employs a continuously variable transmission according to the present invention wherein a torque applied to an input shaft from a driving source preferably varies in accordance with a rotation speed. In order to realize function (2), the rotation speed of the driving source is roughly controlled. Further, a transmission ratio of a toroidal continuously variable transmission is set to a value which is assumed to be required for matching the controlled rotation speed of the driving source with the rotation speed of the input shaft.

The embodiment is preferably provided with a clutch which transmits rotation movements when connected. The case where the torque passing through a toroidal continuously variable transmission specified in (3) fails to become stable corresponds to a case where the clutch is disengaged upon selection of a non-travel state.

Under the above condition, a non-travel state is selected during a travel state. Thereafter, function (2) is ceased until elapse of a predetermined period of time.

Alternatively, in the case where a pressure differential between a pair of oil pressure chambers is equal to a predetermined value or less, function (2) is ceased.

Further, a load-detecting device for detecting a load of the driving source is provided. After a travel state is selected during a non-travel state, function (2) is ceased until the load-detecting apparatus detects an increase in a load.

[First Embodiment]

Figure 1:
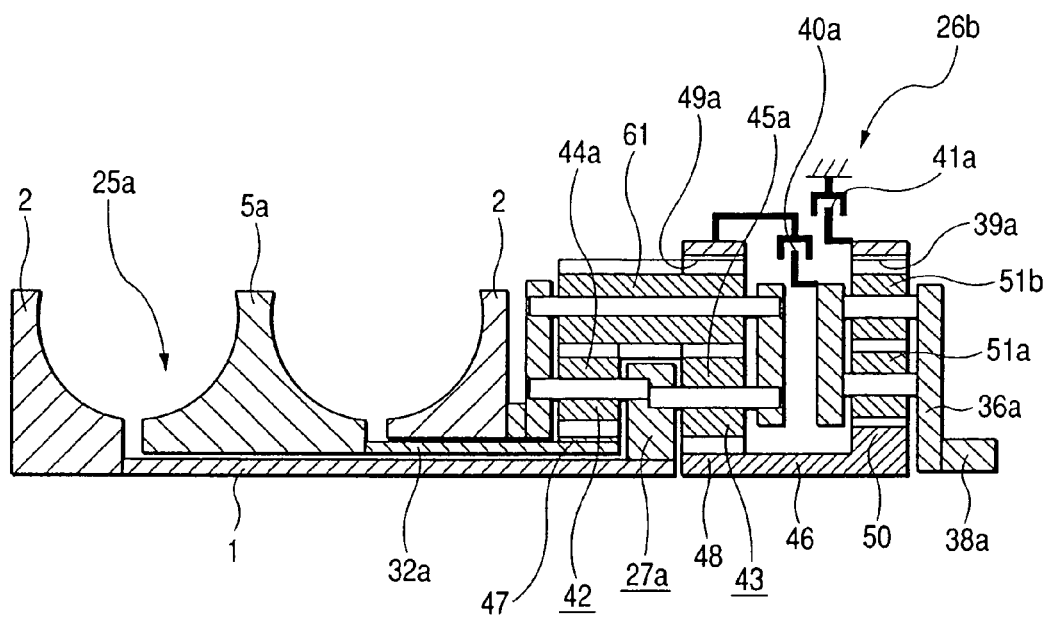
FIG. 1 is a schematic sectional view of one-half of a continuously variable transmission according to a first embodiment of the present invention.

FIGS. 1 through 4 show a first embodiment of the invention. As shown in FIG. 1, a continuously variable transmission is constituted by combining a toroidal continuously variable transmission 25a and a planetary-gear-type transmission 26b of a differential unit. The constitution of the continuously variable transmission is principally the same as that of the continuously variable transmission of aforementioned conventional constitution shown in FIG. 10, or the structure shown in FIG. 11. In the continuously variable transmission of the embodiment, a planetary gear element—which is longer in an axial direction among the planetary gear elements constituting first and second planetary gears 42, 43 of the planetary-gear-type transmission 26b—is used as a planetary gear element 61 and provided on the outer side with respect to a radial direction. The planetary gear element 61 is meshed with planetary gear elements 44a, 45a provided on the inner side with respect to the radial direction. Further, a ring gear having a small width is used as a ring gear 49a which meshes with the planetary gear element 61. According to the structure shown in FIG. 1, the continuously variable transmission apparatus is conceivably reduced in weight by reducing the axial length of the ring gear 49a whose diameter is a large, thereby reducing the volume thereof. Functions of the continuously variable transmission are the same as those of the continuously variable transmission of aforementioned conventional constitution shown in FIG. 10, or the structure shown in FIG. 11.

Figure 2:
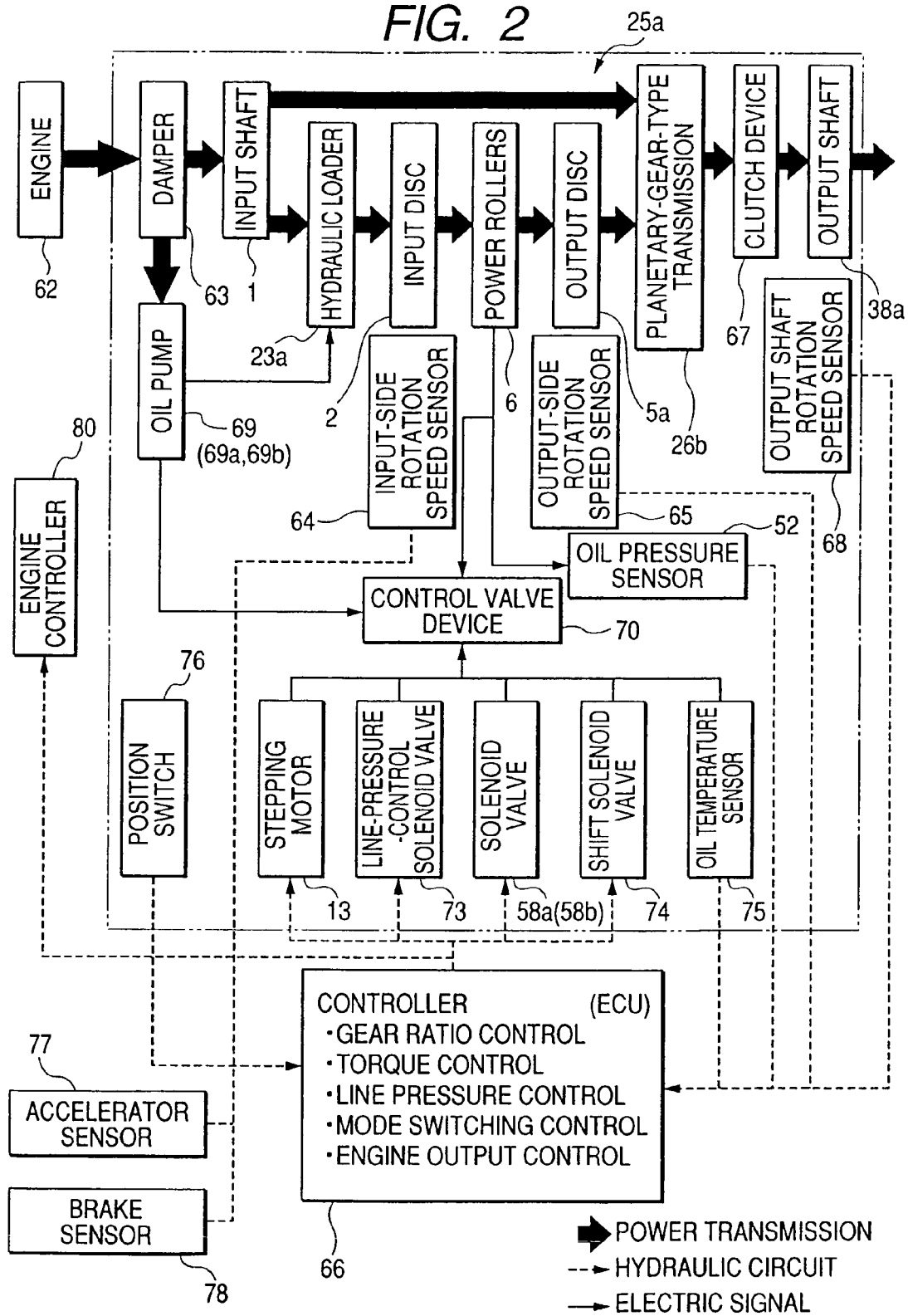
FIG. 2 is a block diagram of the continuously variable transmission according to the first embodiment of the invention.
Figure 3:
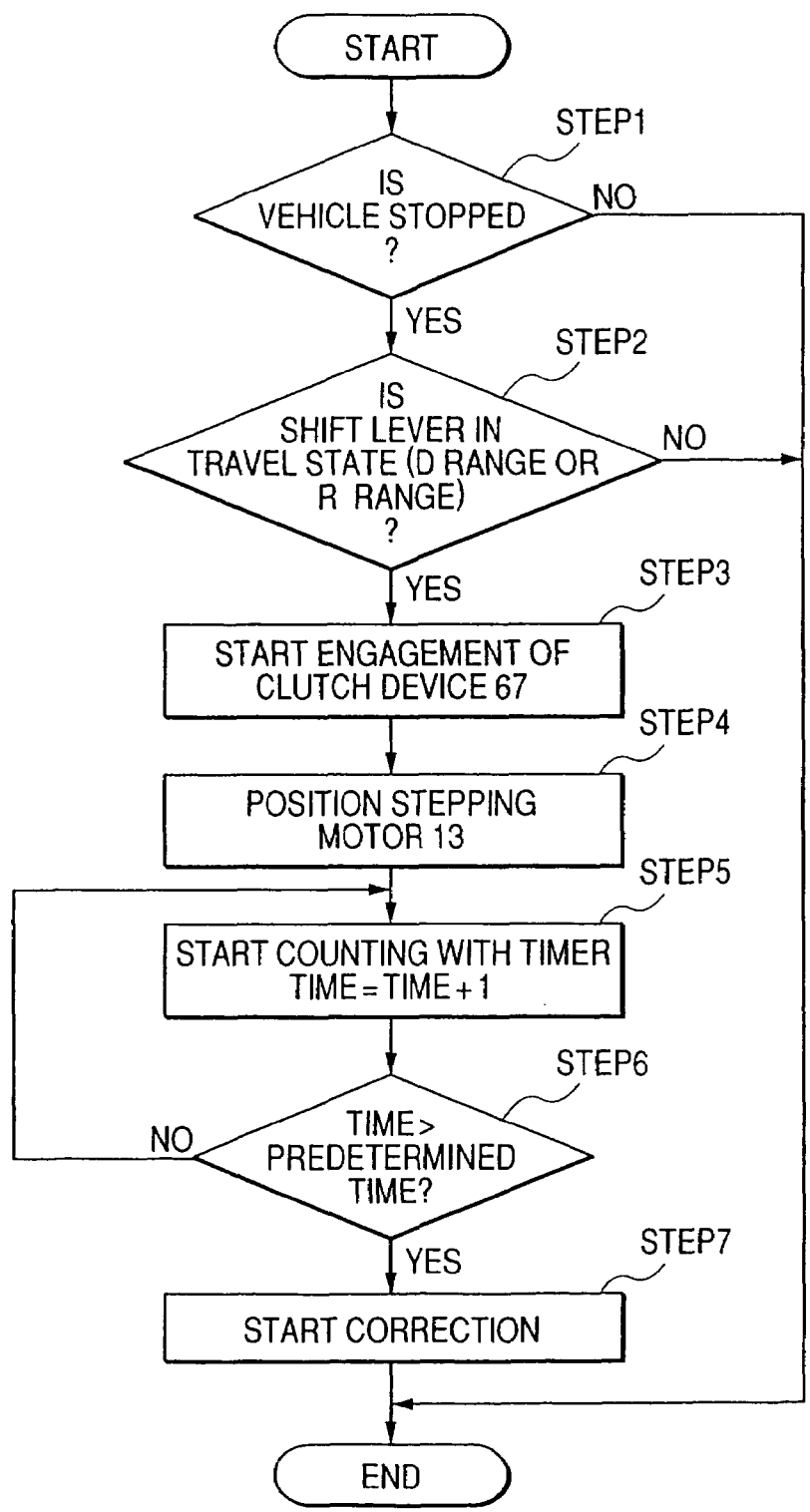
FIG. 3 is a flow chart for explaining operations of the continuously variable transmission according to the first embodiment of the invention.

Next, operation of the continuously variable transmission apparatus of the first embodiment will be explained with reference to FIG. 1, a block diagram of FIG. 2, and a flow chart of FIG. 3. In FIG. 2, heavy arrows indicate power transmission paths, solid lines indicate hydraulic circuits, and dotted lines indicate electric circuits. Output of an engine 62 is input to an input shaft 1 via a damper 63. The damper 63 serves as an elastic joint which smoothes rotation of the engine 62 and transmits it to the input shaft 1. The present invention is characterized in that correction of transmission ratio of a toroidal continuously variable transmission 25a is ceased when a torque passing through the toroidal continuously variable transmission 25a is quite small or is unstable under a state where a clutch device 67 is disengaged or during an engaging process of the clutch 67. Thereby a vehicle on which the continuously variable transmission is mounted is prevented from providing an uncomfortable feeling to a driver at start of the vehicle (i.e., immediately after the start of driving). The constitution of the continuously variable transmission is the same as that shown in FIG. 1. Therefore, to the extent possible, descriptions in relation to FIG. 2, descriptions employ the same reference numerals as those in FIG. 1 for equivalent elements. The invention is also characterized in that a torque fluctuation at a time of engagement of a low-speed clutch 40a is suppressed. Control performed during driving with a high-speed clutch 41a engaged does not fall within the scope of the present invention.

Power transmitted to the input shaft 1 is transmitted to input discs 2, 2 via a hydraulic loader 23a which constitutes the toroidal continuously variable transmission 25a. Further, the power is transmitted to an output disc 5a via power rollers 6. With regard to the discs 2, 5a, rotation speed of the input discs 2 is measured by an input-side rotation speed sensor 64, and that of the output disc 5a is measured by an output-side rotation speed sensor 65. Then, measured values are input to a controller 66. Accordingly, a transmission ratio (i.e., speed ratio) between the discs 2, 5a (of the toroidal continuously variable transmission 25a) can be calculated. The power transmitted to the input shaft 1 is further transmitted to a planetary-gear-type transmission 26b of a differential unit directly or via the toroidal continuously variable transmission 25a. Then, a differential component of constitution members of the planetary-gear-type transmission 26b is taken out to an output shaft 38a via a clutch device 67. Note that the clutch device 67 represents the low-speed clutch 40a and the high-speed clutch 41a shown in the aforementioned FIG. 1 and in FIG. 4 described later. In addition, in the example, the rotation speed of the output shaft 38a can also be detected by an output shaft rotation speed sensor 68. Note that the output shaft rotation speed sensor 68 is provided as a fail-safe device for detecting occurrence of a failure of the input-side rotation speed sensor 64 and the output-side rotation speed sensor 65.

Figure 9:
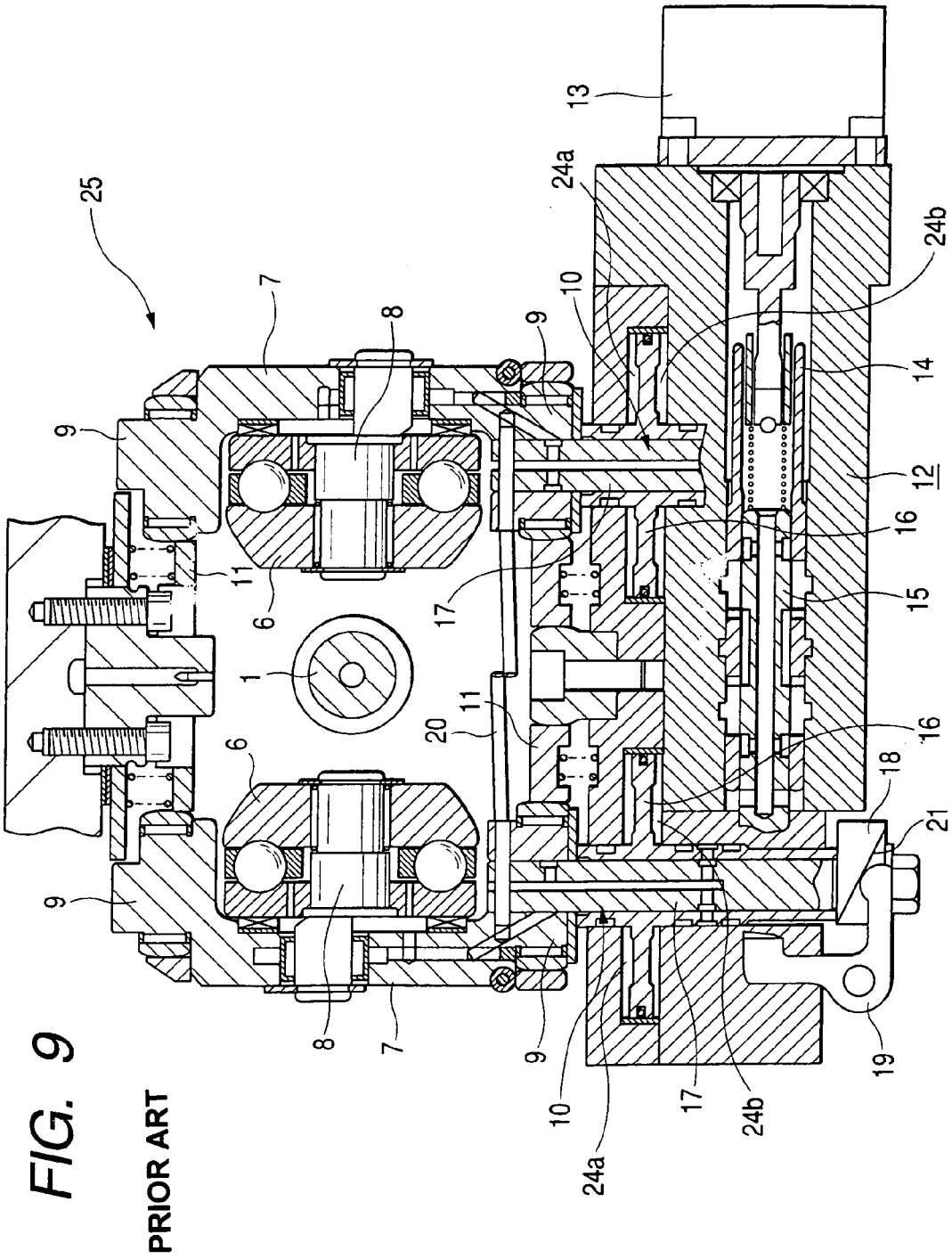
FIG. 9 is a sectional view along line B—B in FIG. 7.
Figure 15:
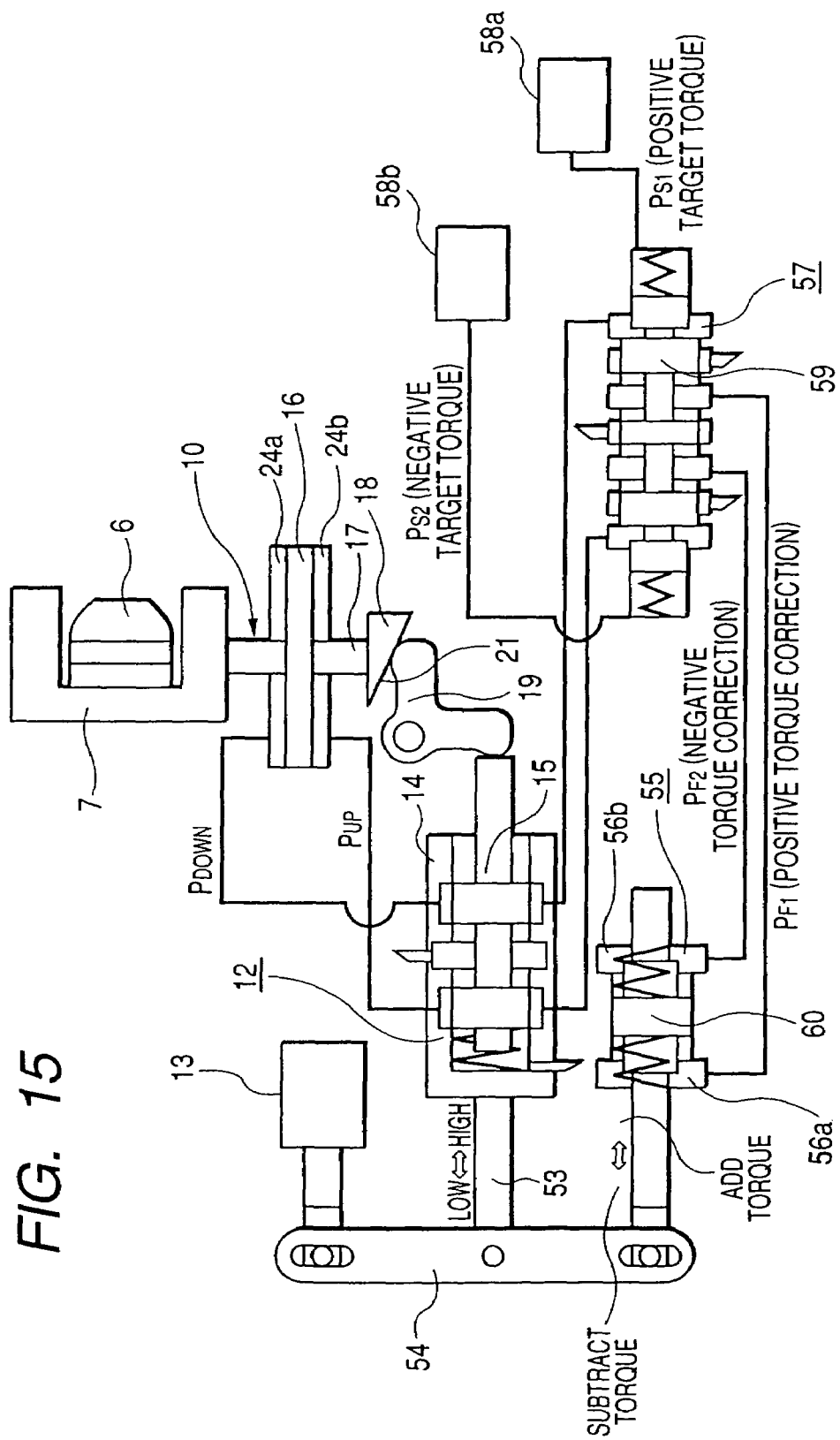
FIG. 15 is a hydraulic circuit diagram showing a mechanism for adjusting a transmission ratio of a toroidal continuously variable transmission constituting an improved continuously variable transmission apparatus based on a conventional mechanism.

Meanwhile, an oil pump 69 is driven by the power taken out from the damper 63. Pressurized oil discharged from the oil pump 69 can be supplied to the hydraulic loader 23a; and to a control valve device 70 for controlling an amount of displacement of the actuator 10 (see FIGS. 4, 9, and 15) for displacing trunnions 7 which support the power rollers 6. Note that the control valve device 70 is constituted of a control valve 12 shown in the aforementioned FIG. 15; a differential cylinder 55; a correcting control valve 57; and a high-speed switch valve 71 and a low-speed switch valve 72 shown in FIG. 4 to be described later. Oil pressures of a pair of oil pressure chambers 24a, 24b (see FIGS. 4, 9, and 15) provided in the actuator 10 are detected by an oil pressure sensor 52 (actually constituted by a pair of oil pressure sensors), and the detection signals are input to the controller 66. The controller 66 calculates a passing torque of the toroidal continuously variable transmission 25a on the basis of the signal from the oil pressure sensor 52.

Meanwhile, an operational status of the control valve device 70 can be switched by a stepping motor 13; a line-pressure-control solenoid valve 73; a solenoid valve 58a (58b) for switching the correcting control valve 57; and a shift solenoid valve 74 for switching the high-speed switch valve 71 and the low-speed switch valve 72. Further, any of the stepping motor 13, the line-pressure-control solenoid valve 73, the solenoid valve 58a (58b) for switching the correcting control valve 57, and the shift solenoid valve 74 can be switched in accordance with a control signal from the controller 66.

In addition to signals from the rotation speed sensors 64, 65, and 68 and the oil pressure sensor 52, a detection signal of an oil temperature sensor 75, a position signal of a position switch 76, a detection signal of an accelerator sensor 77, and a signal of a brake switch 78 are input to the controller 66. The oil temperature sensor 75 detects a temperature of lubricant (i.e., traction oil) in a casing where the continuously variable transmission is contained. The position switch 76 is for generating a signal which indicates a position of a shift lever, which is provided at a driver's seat for the purpose of switching an oil-pressure-manual-switch valve 79 shown in FIG. 4 described later. The accelerator sensor 77 detects a position of an accelerator pedal. The brake switch 78 detects that a brake pedal is being pressed or that a parking brake is actuated and generates a signal indicating the same.

The controller 66 sends control signals corresponding to signals from the switches 76, 78 and the sensors 52, 64, 65, 68, 75, 77 to the stepping motor 13, the line-pressure-control solenoid valve 73, the solenoid valve 58a (58b), and the shift solenoid valve 74. In addition, the controller 66 sends control signals to an engine controller 80 for controlling the engine 62. As is the case with the constitution of FIG. 11 described hitherto, a speed ratio between the input shaft 1 and the output shaft 38a is changed, or a torque applied on the output shaft 38a passing through the toroidal continuously variable transmission 25a (passing torque) is controlled during a vehicle stop or during very low speed driving.

In order to implement the invention with the above constitution, when a non-travel state (i.e., P range or N range) is selected on the basis of a signal from the position switch 76, the controller 66 of the continuously variable transmission according to the example disengages the low-speed clutch 40a and the high-speed clutch 41a. Under the above condition, rotational movement of the input shaft 1 is not transmitted to the output shaft 38a, irrespective of a transmission ratio (i.e., speed ratio) of the toroidal continuously variable transmission 25a. Furthermore, under the above condition, the torque passing through the toroidal continuously variable transmission 25a is substantially zero (except for a torque corresponding to a quite small friction resistance).

Under such a condition, when a transmission ratio of the toroidal continuously variable transmission 25a is controlled on the basis of a torque passing through the toroidal continuously variable transmission 25*a* as described hitherto, the transmission ratio may be corrected excessively. In the example, in order to solve the problem, when non-travel is selected under a vehicle stop state, correction of the transmission ratio of the toroidal continuously variable transmission 25*a* by the correcting control valve 57 is ceased. Expressed another way, in the example, the correction of the transmission ratio of the toroidal continuously variable transmission 25*a* by the correcting control valve 57 under a state where a vehicle is stopped is not implemented until a travel state is selected and the torque passing through the toroidal continuously variable transmission 25*a* becomes stable. This will now be described with reference to FIG. 3.

Under a state where an automobile (vehicle) is stopped (Step 1), when a travel (D range or R range) state is judged to have been selected during a non-travel (P range or N range) state on the basis of a signal from the position switch 76 (Step 2), engagement of a clutch device 67 (the low-speed clutch 40*a* or the high-speed clutch 41*a*) is started (Step 3). Then, concurrently with the above, the stepping motor 13 (see FIGS. 4, 9, and 15) is positioned so that the transmission condition of the continuously variable transmission is set to establish a infinitely variable transmission ratio state where the output shaft 38*a* is stopped while the input shaft 1 rotates (Step 4). Note that the positioning of the stepping motor 13 for implementing the infinite variable transmission ratio state is carried out according to learned values—based on an initial setting and learning repeated through driving and stopping thereafter—stored in memory in the controller 66. However, in the case of the example, the infinitely variable transmission ratio state can be detected on the basis of an output signal from the output shaft rotation speed sensor 68. Therefore, the stepping motor 13 can also be positioned on the basis of the output signal from the output shaft rotation speed sensor 68.

In any case, during Step 4, a transmission state of the continuously variable transmission becomes such that the transmission ratio is infinite or nearly infinite; however, correction by the correcting control valve 57 is not yet performed. Under this state, pressurized oil is not supplied to or discharged from the correcting control valve 57 and the differential pressure cylinder 55, and a spool 60 of the differential pressure cylinder 55 is positioned in its intermediate position. Therefore, a transmission ratio of the toroidal continuously variable transmission 25*a* is not corrected by the correcting control valve 57. In the state when immediately after a start of engagement of the clutch device 67 and before completion of the engagement, the torque passing through the toroidal continuously variable transmission 25*a* is unstable. However, because the above-mentioned correction of the transmission ratio is not yet performed, the toroidal continuously variable transmission 25*a* cannot be corrected excessively (beyond a required amount).

As described above, when the stepping motor 13 is positioned at a position for entering an infinitely variable transmission ratio state simultaneously with the start of engagement of the clutch device 67, a timer in the controller 66 starts counting (Step 5). Thereby, a determination is made as to whether or not a predetermined period of time has elapsed (i.e., a time until the torque becomes stable, which is obtained experimentally in consideration of a temperature during driving, a vehicle-to-vehicle variation, or the like; e.g., a short period of time of one second or less) since the start of engagement of the clutch device 67 (Step 6). The clutch device 67 is completely engaged upon elapse of the predetermined time since the start of engagement, whereby the torque passing through the toroidal continuously variable transmission 25*a* becomes stable. Subsequently, correction by the correcting control valve 57 is started (Step 7). As a result, as is the case with the constitution of the aforementioned FIG. 11, the torque which is transmitted to the output shaft 389 after passing through the toroidal continuously variable transmission 25*a* can be regulated to a desired value.

Note that when the input-side rotation speed sensor 64 and the output-side rotation speed sensor 65 are provided as in the case with the example, the passing torque can also be controlled by calculating a rotation speed and a rotation direction of the output shaft 38*a* on the basis of detection signals from the two rotation speed sensors 64, 65. However, in the example, the correction performed by the correcting control valve 57 is arranged so as to start after the torque passing through the toroidal continuously variable transmission 25*a* has become stable. Thereby, the torque under a condition where a non-travel state is switched to a travel state can be controlled more easily and conveniently. In other words, in the example, under a state where the clutch device 67 is disengaged, control for adjusting the transmission ratio of the toroidal continuously variable transmission 25*a* for regulating the torque passing through the toroidal continuously variable transmission 25*a* to a desired value is not implemented by use of detection signals from both the input-side and the output-side rotation speed sensors 64, 65.

Next, a control circuit suitable for controlling a continuously variable transmission apparatus of the above mentioned invention will be briefly explained with reference to FIG. 4. Note that repeated descriptions are omitted with regard to structures of those portions which have the same structures as those shown in the aforementioned FIG. 15 and are for controlling a stroke of an actuator 10 to thereby adjust the transmission ratio of the toroidal continuously variable transmission by way of the control valve 12, the stepping motor 13, the precess cam 18, the link arm 19, and the differential cylinder 55.

Figure 4:
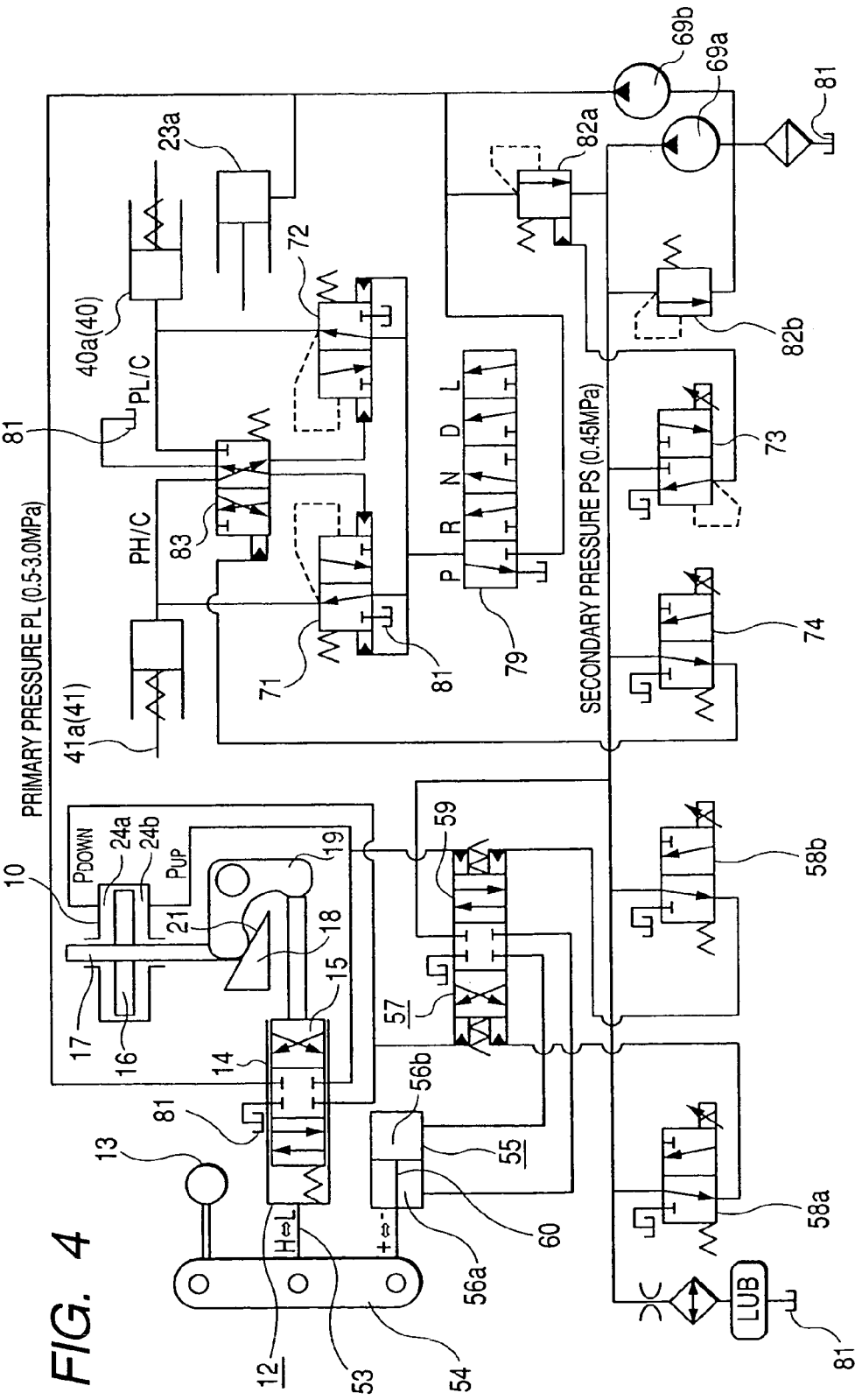
FIG. 4 is a hydraulic circuit diagram showing a mechanism for adjusting a transmission ratio of a toroidal continuously variable transmission incorporated in the continuously variable transmission of the first embodiment.

In a hydraulic circuit shown in FIG. 4, pressure of the pressurized oil suctioned from oil sumps 81 and then discharged from oil pumps 69*a*, 69*b* can be adjusted to a predetermined pressure by means of pressure regulating valves 82*a*, 82*b*. The oil pumps 69*a*, 69*b* correspond to the aforementioned oil pump 69 in FIG. 2. Further, with regard to the two pressure regulating valves 82*a*, 82*b*, an adjustment pressure—applied to the pressure regulating valve 82*a* for adjusting an pressure of oil sent to an oil-pressure-manual-switch valve 79 side to be described later—can be adjusted by means of opening and closing the line-pressure-control solenoid valve 73. Further, the pressurized oil, whose pressure is adjusted by the two pressure regulating valves 82*a*, 82*b*, can be sent to the actuator 10 via a control valve 12. The pressurized oil is also sent to the correcting control valve 57 for adjusting a stroke of the differential pressure cylinder 55 by means of opening and closing the solenoid valves 58*a*, 58*b*.

Moreover, the pressurized oil is arranged so as to be sent to the hydraulic loader 23*a*. The pressurized oil can also be sent to an oil chamber of the low-speed clutch 40*a* (40) or the high-speed clutch 41*a* (41) via the oil-pressure-manual-switch valve 79, and the high-speed switch valve 71 or the low-speed switch valve 72. Of the valves 79, 71, and 72, the oil-pressure-manual-switch valve 79 is switched by a control lever (i.e., shift lever), which is provided at a driver's seat and controlled by a driver, for selecting a parking range (P), a reverse (i.e., backward) range (R), a neutral range (N), a drive (generally forward) range (D), or a forward-with-high-driving-force range (L). FIG. 4 shows the respective switching states of the oil-pressure-manual-switch valve 79 under the states where the respective ranges are selected. Note that structures and functions of the respective valves including the oil-pressure-manual-switch valve 79 are represented in accordance with a general form of engineering drawing of hydraulic equipment.

Communication states of the high-speed and low-speed switch valves 71, 72 are respectively switched upon supply and discharge of pressurized oil on the basis of switching of a shift valve 83 switched by the shift solenoid valve 74. When one of the valves 71 (or 72) sends pressurized oil to an oil chamber of the high-speed clutch 41a (or an oil chamber of the low-speed clutch 40a), the other valve 72 (or 71) discharges pressurized oil from the oil pressure chamber of the low-speed clutch 40a (or the oil chamber of the high-speed clutch 41a).

Figure 10:
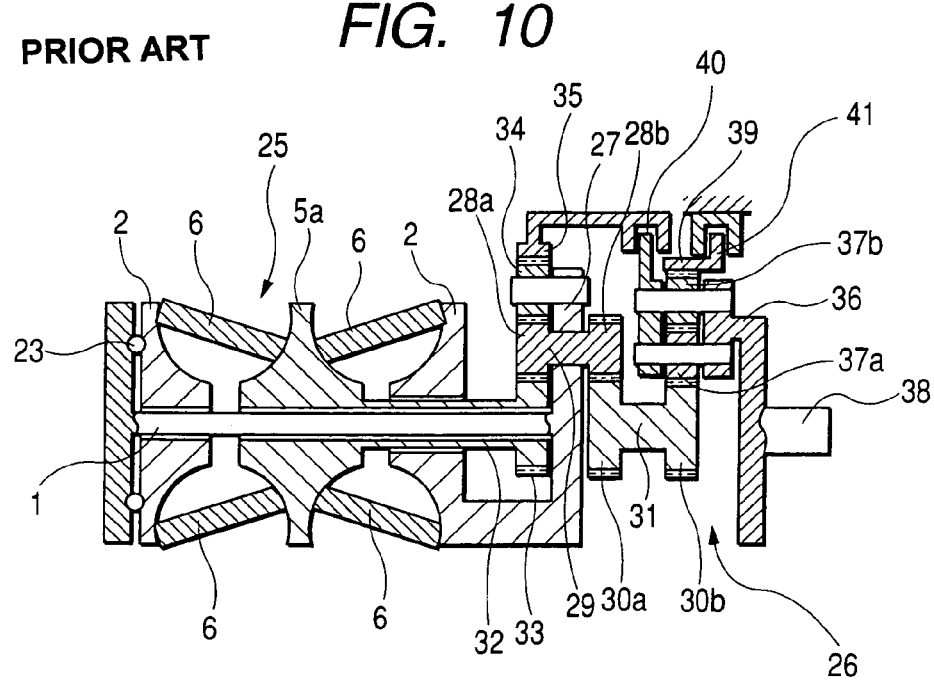
FIG. 10 is a schematic sectional view showing an example of a conventionally known continuously variable transmission.
Figure 11:
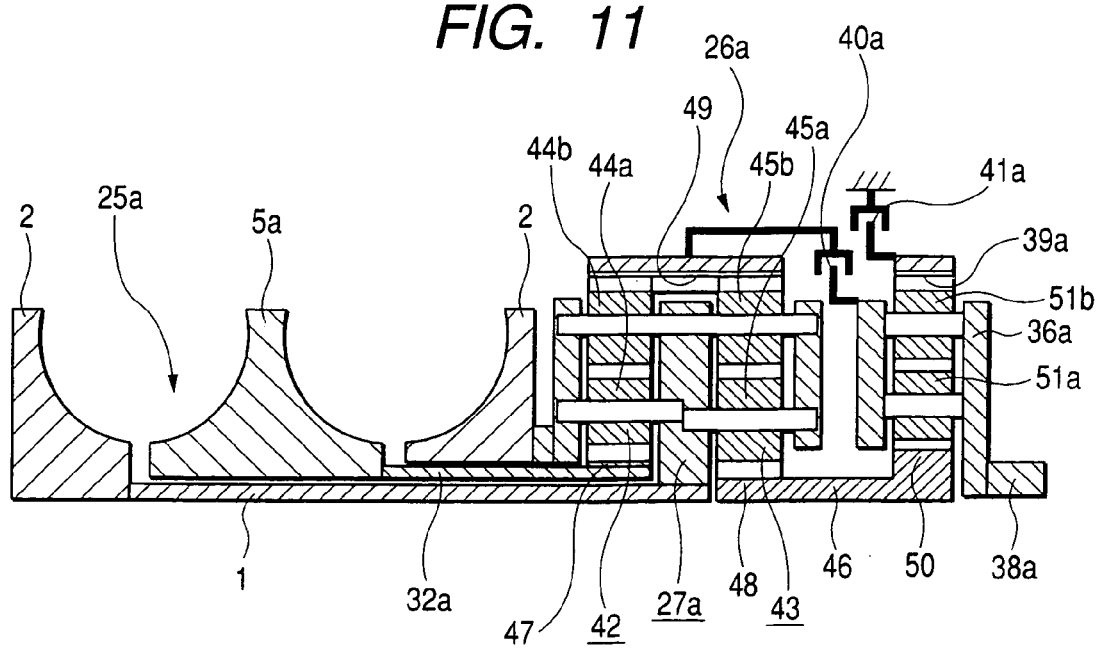
FIG. 11 is a schematic sectional view showing an example of a continuously variable transmission whose transmission ratio is controlled by an improved control device based on a conventional control device.
Figure 12:
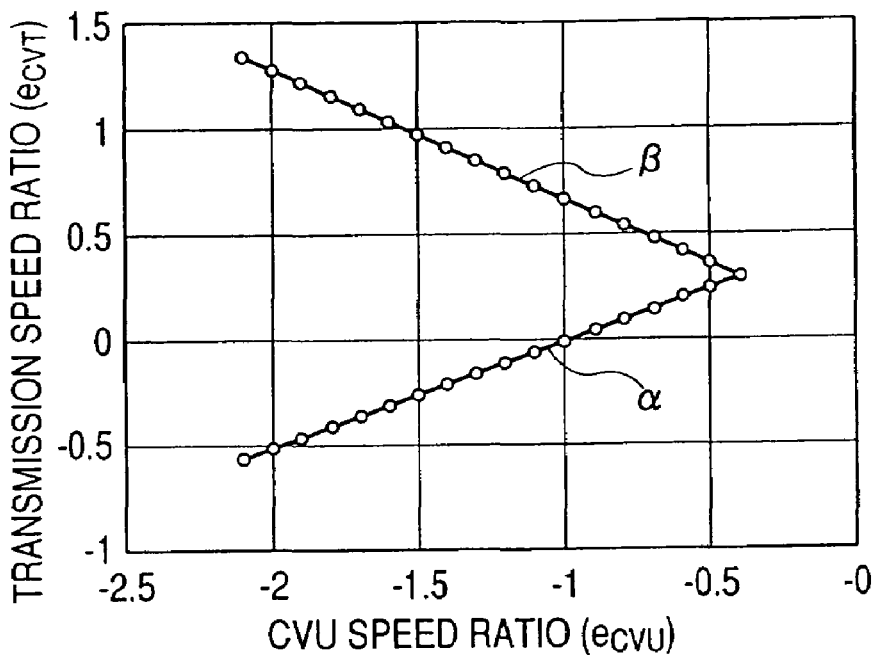
FIG. 12 is a diagram showing a relation between a transmission ratio of a toroidal continuously variable transmission incorporated in the continuously variable transmission and overall transmission ratio of the continuously variable transmission apparatus (T/M)
Figure 13:
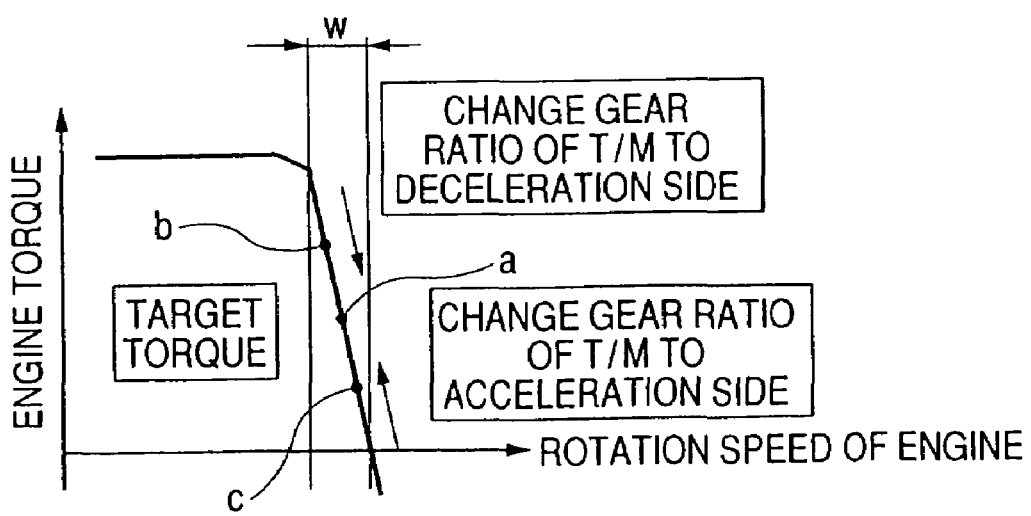
FIG. 13 is a diagrammatic showing a relationship between a rotation speed of an engine and a torque for explaining a condition where a transmission ratio is controlled by an improved control device based on a conventional control device.
Figure 14:
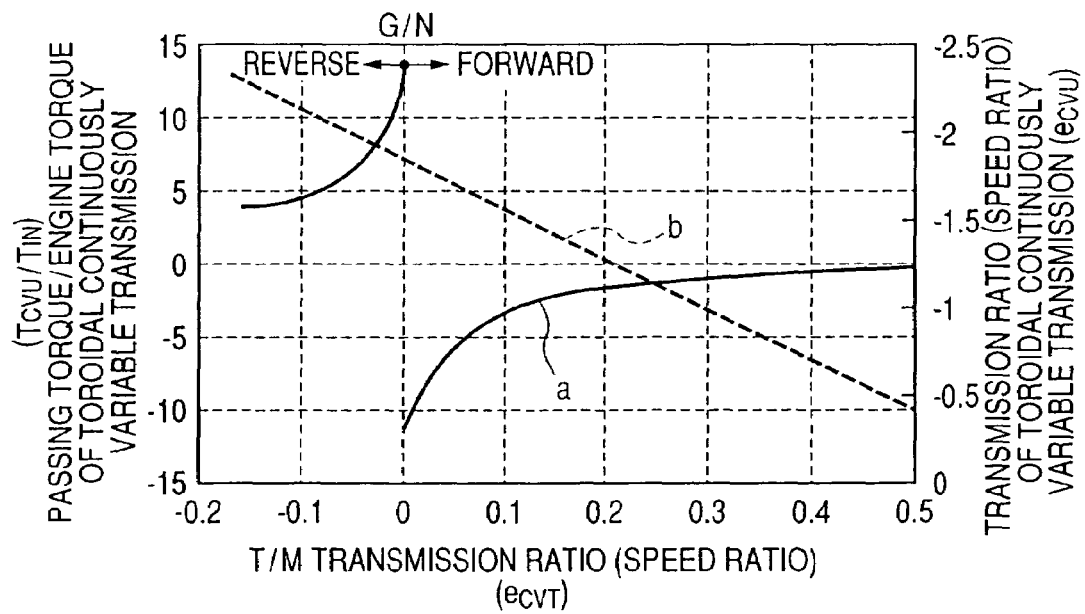
FIG. 14 is a diagram showing a relation between a torque passing through a toroidal continuously variable transmission and a transmission ratio, and an overall transmission ratio of the continuously variable transmission apparatus.

A controller which is provided with a hydraulic circuit constituted as described above and which is incorporated in a continuously variable transmission apparatus constituted as shown in the aforementioned FIGS. 1 and 2 has the following functions (a) through (f):

(a) a function of adjusting a transmission ratio of the toroidal continuously variable transmission 25a so as to change a relative displacement speed of a plurality of gears constituting the planetary-gear-type transmission 26b, thereby changing the rotation condition of the output shaft 38a between the forward-rotating condition and the reverse-rotating condition through the non-rotating condition while the input shaft 1 is kept rotating in a single direction in a low-speed mode by the engine 62 functioning as a driving source; that is, during a driving state where the low-speed clutch 40a is engaged and the high-speed clutch 41a is disengaged (function (a) is the same as that of a continuously variable transmission having a conventionally known constitution shown in aforementioned FIG. 10, or the structure shown in FIG. 11);

(b) a function of changing a transmission ratio between the input shaft 1 and the output shaft 38a to thereby change the transmission ratio of the toroidal continuously variable transmission 25a in a high-speed mode; that is, during a driving state where the low-speed clutch 40a is disengaged and the high-speed clutch 41a is engaged (function (b) is also the same as that of a continuously variable transmission having a conventionally known constitution shown in aforementioned FIG. 10, or the structure shown in FIG. 11.);

(c) a function of adjusting a torque passing through the toroidal continuously variable transmission 25a to thereby change the transmission ratio of the toroidal continuously variable transmission 25a in a low-speed mode; that is, during a driving state where the low-speed clutch 40a is engaged and the high-speed clutch 41a is disengaged {function (2) of a controller};

(d) a function of disengaging both the low-speed clutch 40a and the high-speed clutch 41a under a non-travel state; that is, a state where a parking range or a neutral range is selected by means of the control lever;

(e) a function of reducing a pressing force generated by the loader 23a during a vehicle stop or during very low speed driving so that the pressing force becomes smaller than that generated during normal driving; and (f) a function, during a vehicle stop or very low speed driving and when braking means used for stopping the vehicle is applied, of reducing a torque passing through the toroidal continuously variable transmission 25a so that the torque becomes smaller than that under a condition where the braking means is not applied thereon.

[Second Embodiment]

Figure 5:
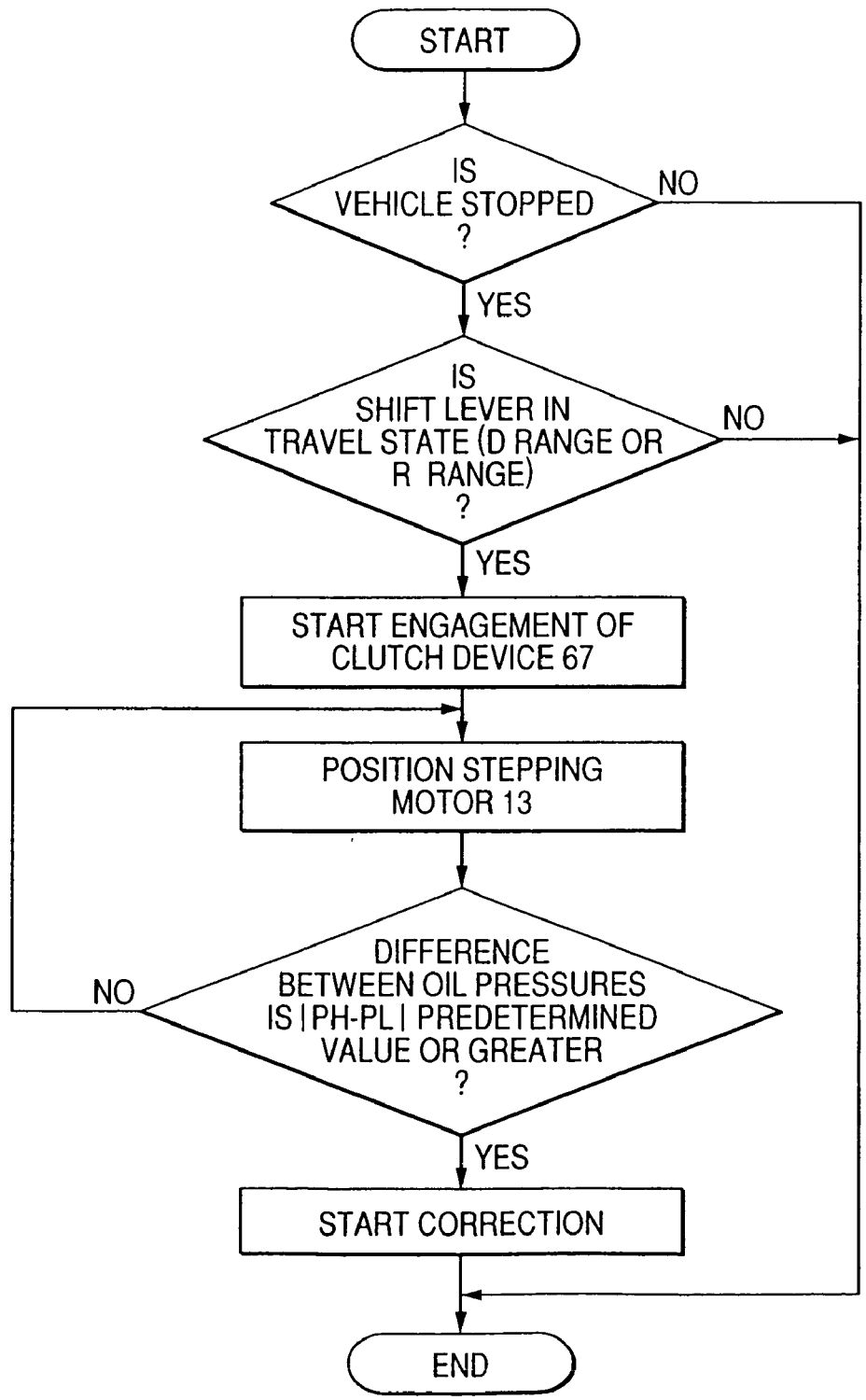
FIG. 5 is a flow chart for explaining operations of a second embodiment of the present invention.

Next, FIG. 5 shows a flow chart for describing operation of a second embodiment of the invention. In the second embodiment, correction by a correcting control valve 57 (see FIG. 4) is started after an oil pressure differential between a pair of oil pressure chambers 24a, 24b provided in an actuator 10 has reached a predetermined value. As described above, an oil pressure differential between the pair of oil pressure chambers 24a, 24b is proportional to a torque passing through the toroidal continuously variable transmission 25a (see FIGS. 1 and 2). Accordingly, by observing the oil pressure differential, engagement of a clutch device 67 (FIG. 2) and stabilization of the torque can be detected. Accordingly, the correction is arranged so as to start when the oil pressure differential indicates that the torque has become stable. After the correction is started, the torque which is transmitted to the output shaft 38a after passing through the toroidal continuously variable transmission 25 (see FIGS. 1 and 2) is regulated to a desired value, as in the case of the aforementioned structure shown in FIG. 11 and the aforementioned first embodiment.

[Third Embodiment]

Figure 6:
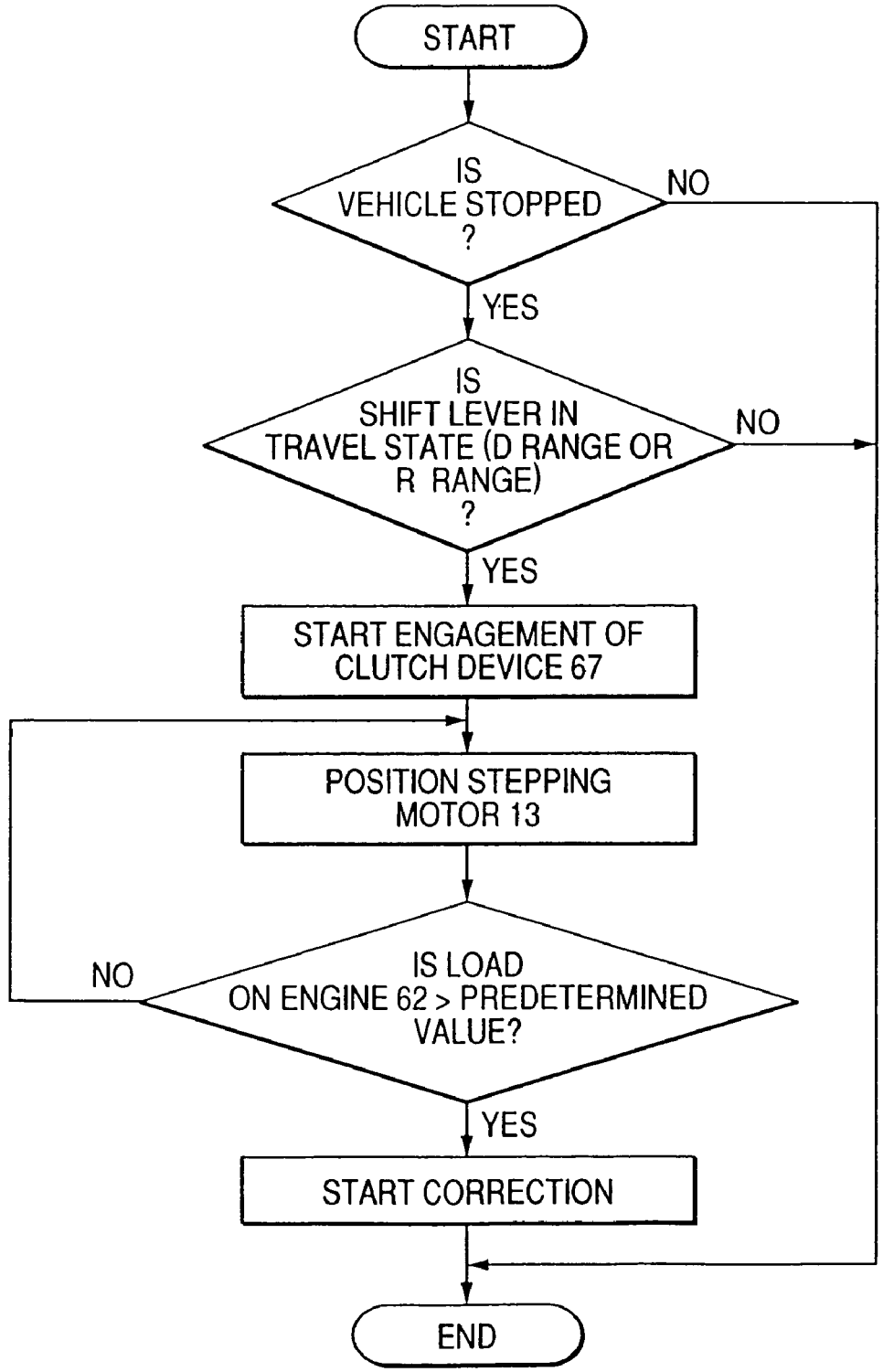
FIG. 6 is a flow chart for explaining operations of a third embodiment of the invention.
Figure 7:
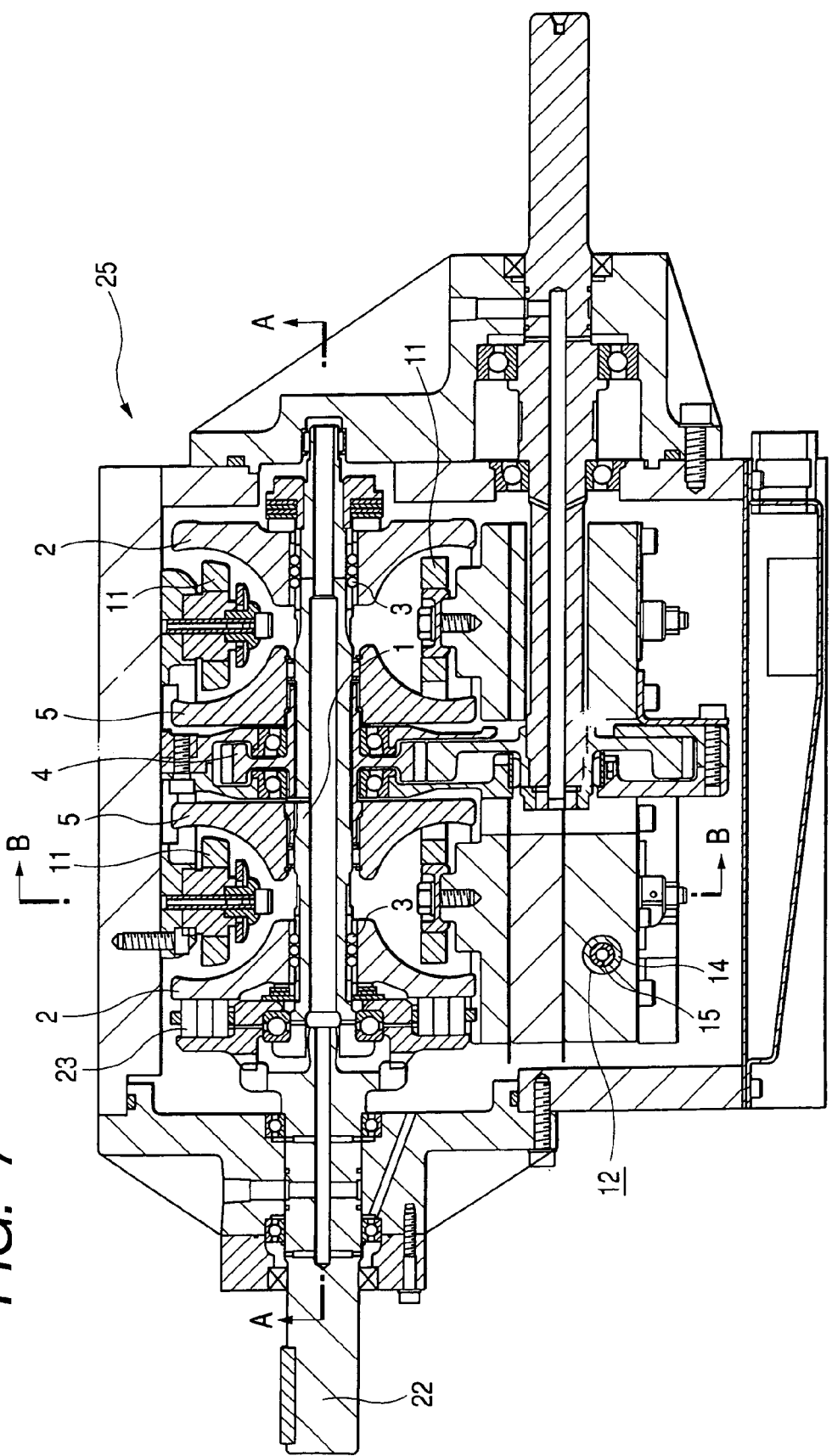
FIG. 7 is a sectional view showing an example of a conventionally known toroidal continuously variable transmission.
Figure 8:
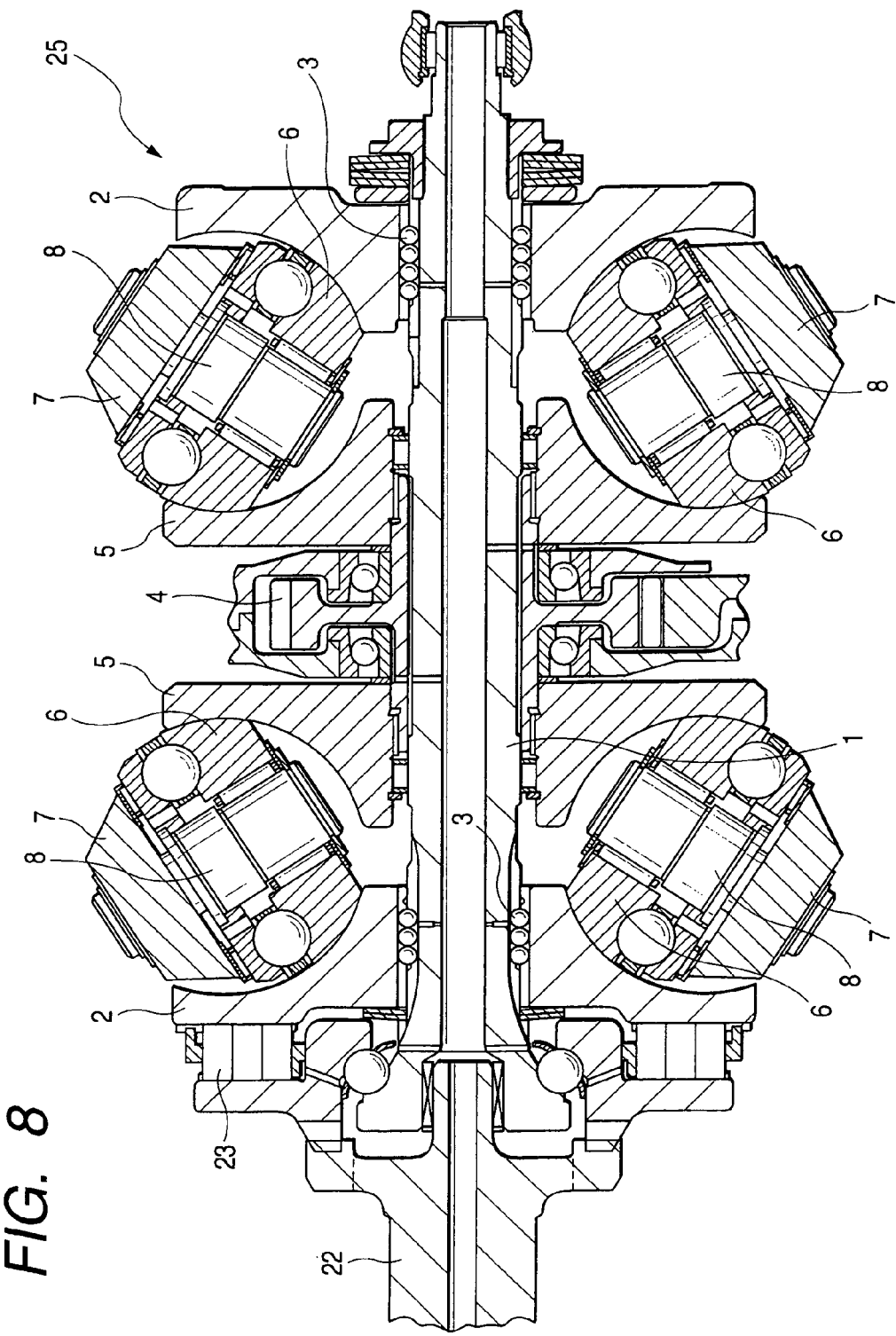
FIG. 8 is a sectional view along line A—A in FIG. 7.

Next, FIG. 6 shows a flow chart for describing operation of a third embodiment of the invention. In the third embodiment, a load-detecting device for detecting a load on the driving source engine 62 (FIG. 2) is provided. The engine controller 80 (FIG. 2) can be utilized as the load-detecting unit. That is, an increase in the load on the engine can be detected by utilizing a signal for directing that the fuel amount to be supplied to the engine should be increased, which is output from the engine controller 80 when a load on the engine 62 is increased. Then, on the basis of the increase in the load on the engine 62, engagement of the clutch device 67 (FIG. 2) and stabilization of the torque passing through the toroidal continuously variable transmission 25a (see FIGS. 1 and 2) can be detected. Therefore, the correction is arranged so as to start when the increase in the load of the engine 62 indicates that the torque has become stable. After the correction is started, the torque which is transmitted to the output shaft 38a after passing through the toroidal continuously variable transmission 25 (see FIGS. 1 and 2) is regulated to a desired value, as in the case of the aforementioned structure shown in FIG. 11 and the aforementioned first embodiment.

What is claimed is:

1. A continuously variable transmission apparatus, comprising:
    an input shaft rotated and driven by a driving source;
    an output shaft;
    a toroidal continuously variable transmission;
    a gear-type differential unit including a plurality of gears; and
    a controller for controlling change of a transmission ratio of the toroidal continuously variable transmission;
    wherein
    the toroidal continuously variable transmission comprises:
        an input disc rotated and driven by the input shaft,
        an output disc supported so as to be relatively rotatable with respect to the input disc,
        a plurality of power rollers interposed between the input disc and the output disc,
        a plurality of support members rotatably supporting the respective power rollers, and an actuator having a pair of oil pressure chambers and displacing the support members so as to change the transmission ratio between the input disc and the output disc;

the differential unit comprises:
a first input portion rotated and driven by the input shaft together with the input disc, and
a second input portion connected to the output disc, wherein
a rotational movement which is obtained in accordance with a speed differential between the first and the second input portions is taken out and transmitted to the output shaft; and the controller performs the following functions (1) through (3):
(1) a function of adjusting the transmission ratio of the toroidal continuously variable transmission so as to change a relative displacement speed of the plurality of gears contained in the gear-type differential, thereby converting a rotational condition of the output shaft between a forward-rotating condition and a reverse-rotating condition through a non-rotating condition while the input shaft continues rotating in a single direction;
(2) a function of measuring a differential pressure between a pair of chambers constituting an actuator so as to calculate a torque actually passing through the toroidal continuously variable transmission; thereafter obtaining a deviation, from a target value, of the torque actually passing through the toroidal continuously variable transmission; and thereby adjusting the transmission ratio of the toroidal continuously variable transmission so that the torque passing through a toroidal continuously variable transmission attains the target value, and
(3) a function of stopping the above function (2) in the case where the torque passing through the toroidal continuously variable transmission fails to become stable.

2. The continuously variable transmission apparatus according to claim 1, wherein
the torque applied on the input shaft by the driving source changes depending on a rotation speed; and
the rotation speed of the driving source is roughly controlled, and the transmission ratio of the toroidal continuously variable transmission is set to a value assumed to be necessary for matching the controlled rotation speed of the driving source to a rotation speed of the input shaft so as to realize function (2) of the controller.

3. The continuously variable transmission apparatus according to claim 1, further comprising:
a clutch which transmits a rotational movement when connected, wherein
a case where the torque passing through the toroidal continuously variable transmission which is specified in function (3) of the controller fails to become stable corresponds to the case where the clutch is disengaged in response to selection of a non-travel state.

4. The continuously variable transmission apparatus according to claim 2, further comprising:
a clutch which transmits a rotational movement when connected, wherein
a case where the torque passing through the toroidal continuously variable transmission specified in function (3) of the controller fails to become stable corresponds to the case where the clutch is disengaged in response to selection of a non-travel state.

5. The continuously variable transmission apparatus according to claim 1, wherein
the function (2) of the controller is ceased until elapse of a predetermined period of time after selection of a travel state during a non-travel state.

6. The continuously variable transmission apparatus according to claim 2, wherein
the function (2) of the controller is ceased until elapse of a predetermined period of time after selection of a travel state during a non-travel state.

7. The continuously variable transmission apparatus according to claim 3, wherein
the function (2) of the controller is ceased until elapse of a predetermined period of time after selection of a travel state during a non-travel state.

8. The continuously variable transmission apparatus according to claim 4, wherein
the function (2) of the controller is ceased until elapse of a predetermined period of time after selection of a travel state during a non-travel state.

9. The continuously variable transmission apparatus according to claim 1, wherein
the function (2) of the controller is ceased in the case where a pressure differential of a the pair of oil pressure chambers is equal to a predetermined value or less.

10. The continuously variable transmission apparatus according to claim 2, wherein
the function (2) of the controller is ceased in the case where a pressure differential of a the pair of oil pressure chambers is equal to a predetermined value or less.

11. The continuously variable transmission apparatus according to claim 3, wherein
the function (2) of the controller is ceased in the case where a pressure differential of a the pair of oil pressure chambers is equal to a predetermined value or less.

12. The continuously variable transmission apparatus according to claim 4, wherein
the function (2) of the controller is ceased in the case where a pressure differential of a the pair of oil pressure chambers is equal to a predetermined value or less.

13. The continuously variable transmission apparatus according to claim 1, further comprising:
a load-detecting unit that detects a load of the driving source;
wherein the function (2) of the controller is ceased after selection of a travel state during a non-travel state, until the load-detecting unit detects an increase in a load of the driving source.

14. The continuously variable transmission apparatus according to claim 2, further comprising:
a load-detecting unit that detects a load of the driving source;
wherein the function (2) of the controller is ceased after selection of a travel state during a non-travel state, until the load-detecting unit detects an increase in a load of the driving source.

15. The continuously variable transmission apparatus according to claim 3, further comprising:
a load-detecting unit that detects a load of the driving source;
wherein the function (2) of the controller is ceased after selection of a travel state during the non-travel state, until the load-detecting unit detects an increase in a load of the driving source.

16. The continuously variable transmission apparatus according to claim 4, further comprising:
a load-detecting unit that detects a load of the driving source;

wherein the function (2) of the controller is ceased after selection of a travel state during the non-travel state, until the load-detecting means unit an increase in a load of the driving source.

* * * * *